US008435367B2

(12) United States Patent
Donohue

(10) Patent No.: US 8,435,367 B2
(45) Date of Patent: May 7, 2013

(54) FIXED HEAD INSULATED GLASS EDGE SEALING DEVICE

(75) Inventor: Morgan Donohue, North Oaks, MN (US)

(73) Assignee: Erdman Automation Corporation, Princeton, MN (US)

( * ) Notice: Subject to any disclaimer, the term of this patent is extended or adjusted under 35 U.S.C. 154(b) by 351 days.

(21) Appl. No.: 12/944,262

(22) Filed: Nov. 11, 2010

(65) Prior Publication Data

US 2012/0118473 A1 May 17, 2012

(51) Int. Cl.
*B32B 41/00* (2006.01)

(52) U.S. Cl.
USPC ............. 156/64; 156/350; 156/351; 156/356; 156/367; 156/378; 156/379; 222/153.09; 222/166.5; 222/333; 222/367; 222/546.5; 418/178; 418/179; 418/196; 418/197; 29/888.023; 29/888.025

(58) Field of Classification Search .................... 156/64, 156/350, 351, 356, 367, 378, 379; 222/153.09, 222/166.5, 333, 367, 546.5, 566, 567, 573; 418/178, 179, 196, 197; 29/888.023, 888.025
See application file for complete search history.

(56) References Cited

U.S. PATENT DOCUMENTS

| | | | |
|---|---|---|---|
| 4,546,723 | A | 10/1985 | Leopold et al. |
| 4,634,024 | A | 1/1987 | Vollenweider |
| 4,714,425 | A | 12/1987 | Lenhardt |
| 4,826,547 | A | 5/1989 | Lenhardt |
| 5,136,974 | A | 8/1992 | Lisec |
| 5,290,600 | A | 3/1994 | Ord et al. |
| 5,319,186 | A | 6/1994 | Lenhardt |
| 5,462,199 | A | 10/1995 | Lenhardt |
| 5,902,652 | A | 5/1999 | Collins et al. |
| 6,017,578 | A | 1/2000 | Trautmann et al. |
| 6,030,475 | A | 2/2000 | Spotts, Jr. |
| 6,032,830 | A | 3/2000 | Brown |
| 6,197,231 | B1 | 3/2001 | Lisec |
| 6,234,355 | B1 | 5/2001 | Lenhardt |
| 6,257,444 | B1 | 7/2001 | Everett |
| 6,491,966 | B1 | 12/2002 | Lisec |
| 6,494,245 | B1 | 12/2002 | Simone |
| 6,554,043 | B2 | 4/2003 | Simone |
| 6,630,028 | B2 | 10/2003 | Briese et al. |
| 6,688,874 | B1 | 2/2004 | Simone |

(Continued)

OTHER PUBLICATIONS

Marketing Brochure, Glass Equipment Development, Inc., *Our Fully Integrated Line of IG Fabrication Machinery,* 2002, pp. 6.

(Continued)

*Primary Examiner* — Katarzyna Wyrozebski Lee
*Assistant Examiner* — Joshel Rivera
(74) *Attorney, Agent, or Firm* — Patterson Thuente Pedersen, P.A.

(57) ABSTRACT

An insulated glass secondary edge sealing device that dispenses sealant to insulated glass units including at least two panes of glass separated by a spacer, including a fixed sealant dispensing head, a table that supports the insulated glass units, a fence, a depth sensor, a linear motion encoder, a metering device. The sealant dispensing head has a dispensing nozzle and a corner dam. The dispensing nozzle includes a floating insulated glass unit contact surface and the corner dam is shiftable between a retracted position and an extended position. A control unit receives signals from the depth sensor and the linear motion encoder and controls the metering device to dispense a measured flow of sealant based on the depth of the inset of the spacer and the movement of the insulated glass unit parallel to the fence and relative to the encoder.

17 Claims, 13 Drawing Sheets

U.S. PATENT DOCUMENTS

| | | | |
|---|---|---|---|
| 6,926,782 | B2 | 8/2005 | McGlinchy |
| 6,957,478 | B1 | 10/2005 | Ontiveros |
| 7,084,964 | B2 | 8/2006 | Kubota |
| 7,448,246 | B2 | 11/2008 | Briese et al. |
| 2002/0069823 | A1 | 6/2002 | Briese et al. |
| 2002/0108696 | A1 | 8/2002 | Simone |
| 2003/0075563 | A1 | 4/2003 | Bazzo et al. |
| 2003/0080153 | A1 | 5/2003 | Saidman et al. |
| 2004/0074595 | A1 | 4/2004 | Simone |
| 2004/0255852 | A1 | 12/2004 | Briese et al. |
| 2006/0011649 | A1 | 1/2006 | Erdman et al. |
| 2007/0074803 | A1 | 4/2007 | Spotts et al. |
| 2008/0286077 | A1 | 11/2008 | McGlinchy |

OTHER PUBLICATIONS

Marketing Brochure, Graco, Inc., *PrecisionFlo™XL, Electronically Controlled Fluid Metering System,* 2001, pp. 15.

Wet-Glazing . . . Versa-Glaze 1500; Benefits of the Versa-Glaxe 1500; 1 page; Oct. 5, 2010.

FIXED HEAD INSULATED GLASS EDGE SEALING DEVICE

FIELD OF THE INVENTION

The invention relates to edge sealing of insulated glass units having at least two panes of glass with an air space in between and a spacer near the periphery of the insulated glass unit. More specifically, the invention relates to application of the secondary seal to insulated glass units.

BACKGROUND OF THE INVENTION

Insulated glass units are commonly used in windows and doors because of their superior resistance to heat flow as compared to single glazed windows or doors. Their superior insulating qualities make insulated glass units useable for almost any application in which a structure is temperature controlled inside as compared to the outside.

Insulated glass units generally include at least two panes of glass having identical shapes. The two panes of glass are separated by an air gap and held together by a spacer which follows the exterior perimeter of the two panes of glass and is inset somewhat from the peripheral edges of the two panes of glass. The spacer is adhesively bonded to the two panes of glass and creates the, so called, primary seal between the two panes of glass. The space thus formed between the two panes of glass may be filled with ambient air or other gases to create a dead space which provides the insulating qualities of insulated glass units.

As discussed above, the spacer in an insulated glass unit is inset from the peripheral edges of the glass panes leading to a trough shaped space bounded on two sides by the glass panes and on one side by the spacer. In the manufacturing of insulating glass units, this space is filled with an adhesive sealant which forms the, so called, secondary seal of the insulated glass unit. The secondary seal may be applied using a variety of different adhesive sealants. These include time setting sealants, such as silicones or butyl rubber sealants. Sometimes two part sealants utilizing a resin and a catalyst to polymerize the resin are utilized. More commonly in modern manufacturing, hot melt adhesive sealants are used. Hot melt adhesive sealants are general applied in a liquid state at a temperature of approximately 350° F. and harden upon cooling to ambient temperature.

In high volume manufacturing facilities, the secondary seal is commonly applied by fully automated equipment in which a computer controlled robotic sealant applying head is moved around the peripheral edges of the insulated glass unit under computer control and applies the sealant to the edge or edges of the insulated glass unit. Fully automated secondary edge sealing equipment of this sort can apply to the secondary seal to very large numbers of insulating glass units in a production run. Typically, the insulated glass units in these circumstances are produced in large runs of identical units.

Fully automated edge sealing equipment of this type requires highly precise computer numerically controlled programming in order to apply a consistent edge seal. Because of this and the requirement that the equipment be programmable to handle many different sizes and shapes of insulated glass units cause this sort of equipment to be quite expensive to purchase and maintain.

There also exist in the window and door manufacturing industry smaller manufacturing facilities at which short runs of custom made windows or doors are manufactured in small quantities or even in single unique units. In these facilities, secondary edge sealing is generally accomplished by hand held equipment in which an operator applies the secondary sealant with a device similar to a caulking gun. These hand held dispensing units may have power to assist to dispensing the sealant and some control over the dispensing rate that is automated. It is not possible to make as consistent quality edge seals with these devices as fully automated equipment and the operator must have considerable practice and skill in order to achieve a good result.

Accordingly, there is still room for improvement in the area of secondary edge sealing of insulated glass units.

SUMMARY OF THE INVENTION

The fixed head insulated glass unit edge sealant according to an embodiment of the invention, generally includes a table having a fence, a fixed head sealant dispenser, a controller and a sealant supply.

The table generally includes a surface that allows minimally restricted multi-directional movement of an insulated glass unit (IGU) when the IGU is laying horizontally on the table surface. According to one example embodiment of the invention, the table includes multi-directional rollers on the surface thereof. In another embodiment of the invention, an air table may be utilized. In a further embodiment of the invention, ball bearing rollers may be utilized as the support surface of the table. Yet another embodiment of the invention, casters may be utilized.

One embodiment of the invention includes an operator space located within the table and a moveable IGU support that is moveable within the operator's space to adjust for the different sizes of insulated glass units that are being sealed.

According to one example embodiment of the invention, a fence is located at one edge of the table. The fence serves to provide a linear barrier along which insulated glass units that are to be edge sealed can be moved. The fence can include for example, a vertical barrier having a low friction surface on the side facing the table. The low friction surface may include but is not limited to nylon, Teflon or plastic laminates. In another example embodiment of the invention, the fence includes vertically oriented rollers against which the IGU's can be moved. The fence is aligned with the fixed head sealant dispenser.

The fixed head sealant dispenser in accordance with an example embodiment of the invention, generally includes a high volume metering pump, a dispensing nozzle, a depth sensor, a dam, proximity sensors and a device for sensing movement parallel to the fence. One example embodiment of the invention includes a dual dispensing nozzle for edge sealing of triple glazed insulated glass units. The dual dispensing nozzle has dual skis that share an interdigitated common edge that is adapted to ride along the edge of the center pane of glass in a triple glazed insulated glass unit.

The fixed head sealant dispenser may also include proximity sensors, for example, to sense the presence of an insulated glass unit to cause lowering of the dispensing head and extension of the dam. A second proximity sensor may be utilized to actuate an auto-stop of the dispensing pump when the end of a side of the insulated glass unit is reached. An example embodiment of the present invention may also include a heated nozzle garage, a laser indicator aligned with the nozzle orifice or a mastic regulator.

The high volume metering pump in accordance with one aspect of the invention may have a volume capacity of approximately 15 gallons per minute which far exceeds the required pumping capacity for edge sealing. The use of this high volume pump permits the pump to operate at 30-50 revolutions per minute instead of approximately 200 revolutions per minute. This arrangement greatly increases the useful life of the high volume metering pump.

An example dispensing nozzle in accordance with the invention generally includes a dispensing orifice and a ski assembly which permits the dispensing nozzle to ride along the edge of an insulated glass unit. In one example embodiment, the dispensing nozzle has a quick change feature which utilizes a cam latch to apply pressure to the nozzle to seat it into its receptacle. The cam latch is useful to prevent dislodging of the nozzle under the high pressure utilized when applying this to sealants. In accordance with example embodiments of the invention, the cam latch may have a front or rear location for convenience of the operator when the nozzle is to be changed.

The dispensing nozzle orifice may be generally slot or dumbbell shaped and oriented perpendicular to the long axis of the edge sealing cavity to be sealed.

The ski of the dispensing nozzle, in an example embodiment of the invention, includes a spring or other biasing member to press the ski outwardly slightly away from the dispensing orifice. In an example embodiment of the invention, the surface of the ski that contacts the insulated glass unit is mirror polished and has a shallow radius of curvature. The inventor of the present invention has discovered that a two to four inch radius of curvature is useful for edge sealing insulated glass units of various commonly encountered thicknesses.

One example embodiment of the invention includes a dual dispensing nozzle for use with triple glazed insulated glass units. The dual dispensing nozzle for triple glazing includes two skis as described above. The two skis have a specially designed interdigitated interlocking structure so that the two skis appropriately ride along the edge of the glass panes of a triple glazed insulated glass unit.

The depth sensor, in accordance with an example embodiment of the invention, senses the depth or inset of the spacer along the perimeter of an insulated glass unit and judges the distance from the edge of the glass panes to the location of the spacer. The depth sensor in accordance with an example embodiment may include for example a mechanical finger sensor or an ultrasound sensor. Other types of depth sensors or distance sensors known to those of ordinary skill in the art may be utilized as well. Data from the depth sensor is utilized to adjust the volume of sealant dispensed from the dispensing nozzle to edge seal an insulated glass unit. The depth sensor is valuable because spacers are not always applied exactly parallel to the edge of the insulated glass unit panes.

The fixed head sealant dispenser may also include a perpendicular moveable dam. The dam, when extended, is generally perpendicular to the edge of the insulated glass unit and to the ski or skis of the dispensing nozzle. The dam functions as stop for halting movement of the insulated glass unit at a desired location for starting edge sealing. The dam also serves to confine an initial prestart application of adhesive sealant to seal the corner area of an insulated glass unit at the beginning of an edge sealing application. The dam may also be heated in one embodiment of the invention.

The device for sensing movement parallel to the fence may include an encoder that senses manual linear movement of the IGU parallel to the fence. The encoder may be embodied in the form of a wheel having a frictional rim which rides against the insulated glass unit when it is moved. The encoder provides speed of movement or relative movement information to the controller to calculate the dispensing rate of the dispensed sealant. In another embodiment of the invention, the device for sensing movement parallel to the fence may include pinch rollers which may be powered to assist movement or may be passive in order to sense movement if the insulated glass unit is moved manually. The encoder or pinch rollers, in particular, the pinch rollers may be utilized to provide a prestart of the pump prior to motion of the insulated glass unit relative to the fixed dispensing head, for example, in the case of a two part sealant which is passed through a static mixing tube prior to being dispensed. In this case, the pump is started prior to the beginning of movement of the insulated glass unit to provide time for the sealant to overcome the friction of the static mixing tube.

Another example embodiment of the invention may include a heated nozzle garage. The heated nozzle garage may include an enclosure or a block of metal having significant thermal mass. The dispensing nozzle is retracted into or against the heated nozzle garage between dispensing operations to heat the dispensing nozzle at a temperature that will maintain the sealant in a fluid state when using a hot melt sealant. The heated nozzle garage need not be an enclosure, but instead can be block of metal against which the nozzle is pressed so that thermal energy from the heated block of metal is transferred by conduction to the dispensing nozzle to maintain fluidility of the hot metal sealant.

Another embodiment of the invention includes a laser indicator aligned with the nozzle orifice. The laser indicator can be used by an operator to assist in deciding when to stop the flow of sealant at the end of an insulated glass unit sealing when the full perimeter of the insulated glass unit has been transited.

Another embodiment of the invention includes a mastic regulator. The mastic regulator serves to lengthen pump life.

The controller in accordance with the invention includes a human machine interface (HMI). The human machine interface includes a computer monitor, optionally of a touch screen variety, which includes operator controls. For example, the HMI is used to adjust the device for the known width of the spacer in the insulated glass unit, thereby providing one piece of information toward calculating the amount of sealant to be applied. The human machine interface also includes a foot switch which is actuated by the operator to operate the machine. The human machine interface also includes a processor unit which may be based on a personal computer or other dedicated processor. The processor unit can be programmed with the information to operate the fixed head insulated glass unit edge sealer.

The sealant supply is supplied to the unit under pressure from a supply of sealant, often a heated 55 gallon drum with a pressure pump. The sealant supply can be any source of supply of sealant whether hot melt sealant, two part sealant or time setting sealant that provides significant sealant to supply the pump metering device in order to allow the edge sealing of insulated glass units.

DETAILED DESCRIPTION OF THE DRAWINGS

Figure 1:
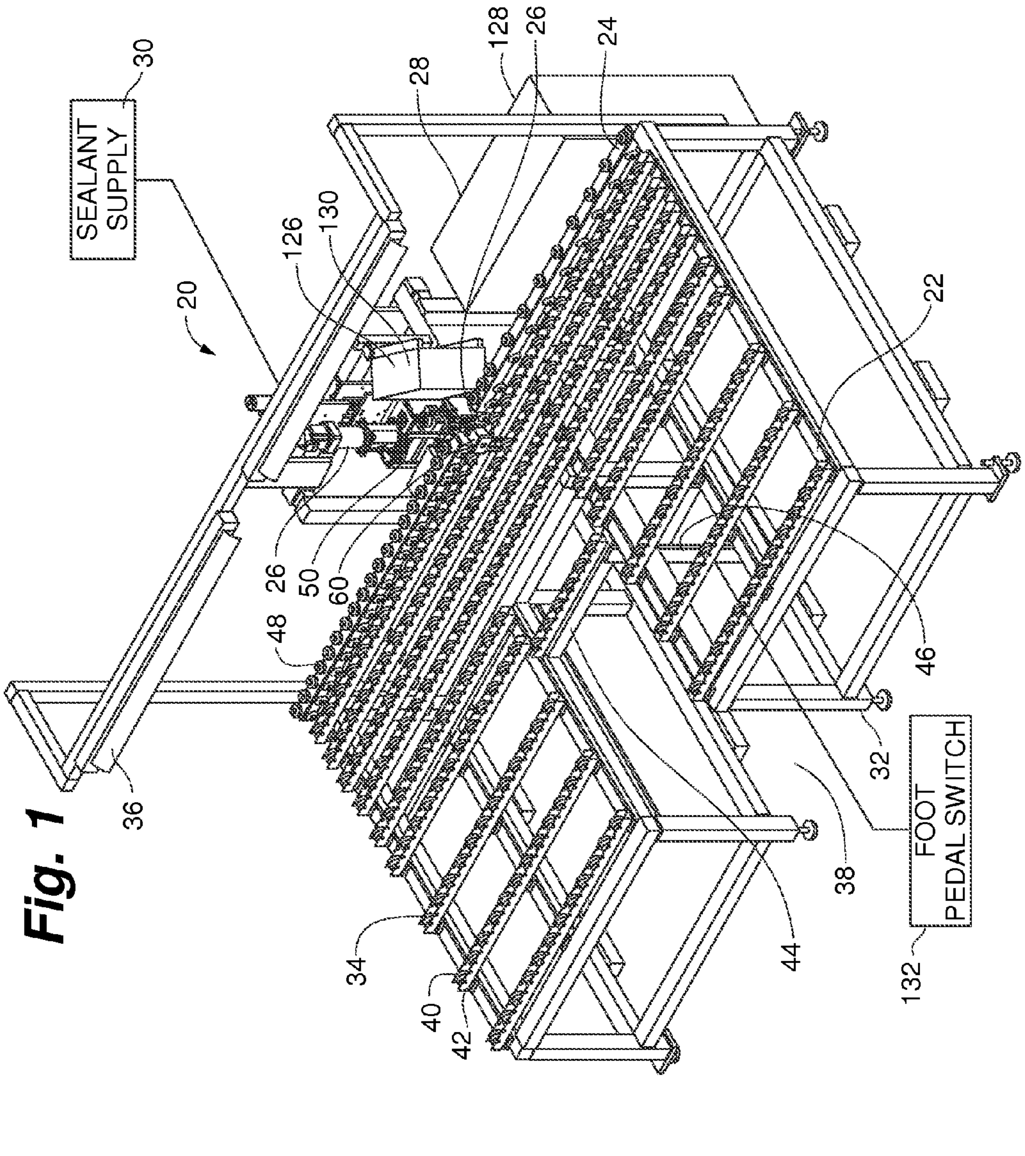
FIG. 1 is a perspective view of a fixed head secondary edge sealing device for insulated glass units in accordance with an embodiment of the invention.

Referring to FIG. 1, fixed head IGU edge sealer 20 according to an embodiment of the invention generally includes table 22, fence 24, fixed head sealant dispenser 26, controller 28 and sealant supply 30.

Table 22 generally includes ground engaging legs 32, IGU support structures 34 and overhead lights 36. Table 22 is sized to accommodate the largest insulated glass unit that it is expected to be used to edge seal. Table 22 according to an example embodiment of the invention is generally U-shaped when viewed from above and defines operator space 38 within table 22. IGU support structures 34 are structured to permit minimally restricted multi-directional movement of a generally planar object such as an insulated glass unit that is placed horizontally upon table 22.

In one example embodiment, table 22 includes a plurality of multi-directional rollers 40 thereon. Multi-directional rollers may be supported in rows by a plurality of U-profile channels 42. Multi-directional rollers 40 may include simplex rollers or duplex rollers. One acceptable type of multi-directional roller 40 that can be used in accordance with the invention is described in U.S. Pat. No. 5,404,984 to Hagman. Such rollers can be purchased from ErgoTech Inc. located at 11 Old New Town Road, Commerce Park, Danbury, Conn. 06810.

Other IGU support structures 34 that may be utilized include an air table (not shown), ball bearing rollers (not shown) or casters (not shown).

Operator space 38 is made of appropriate dimensions to permit an operator to approach closely enough to fixed head sealant dispenser 26 to manually manipulate small size insulated glass units that may be edge sealed by operation of the invention.

Operator space 38 may include moveable IGU support 44. Moveable IGU support 44 is slidably adjustable within operator space 38 in a direction that permits moveable IGU support 44 to be moved closer to or further from fixed head sealant dispenser 26. Moveable IGU support 44 may include one or more U-profile channels 42 including multi-directional rollers 44 or other IGU support structures 34 described above. U-profile channels 42 of moveable IGU support 44 may be oriented generally parallel to fence 24. Moveable IGU support 44 may also include foot pedal support 46 moveable therewith.

According to an embodiment of the invention, U-profile channels 42 are arranged generally parallel to fence 24 and parallel to the direction in which insulated glass units to be sealed are to be moved in the sealing process.

Fence 24 according to the embodiment depicted in FIG. 1, includes vertically oriented rollers 48. Vertically oriented rollers 48 are arranged in a row along the top of fence 24. Fence 24 may also include a vertical wall structure covered with a low friction material such as, for example, nylon, plastic laminate or Teflon.

Fence 24 is located along an edge of table 22 that is near to fixed head sealant dispenser 26.

Figure 2:
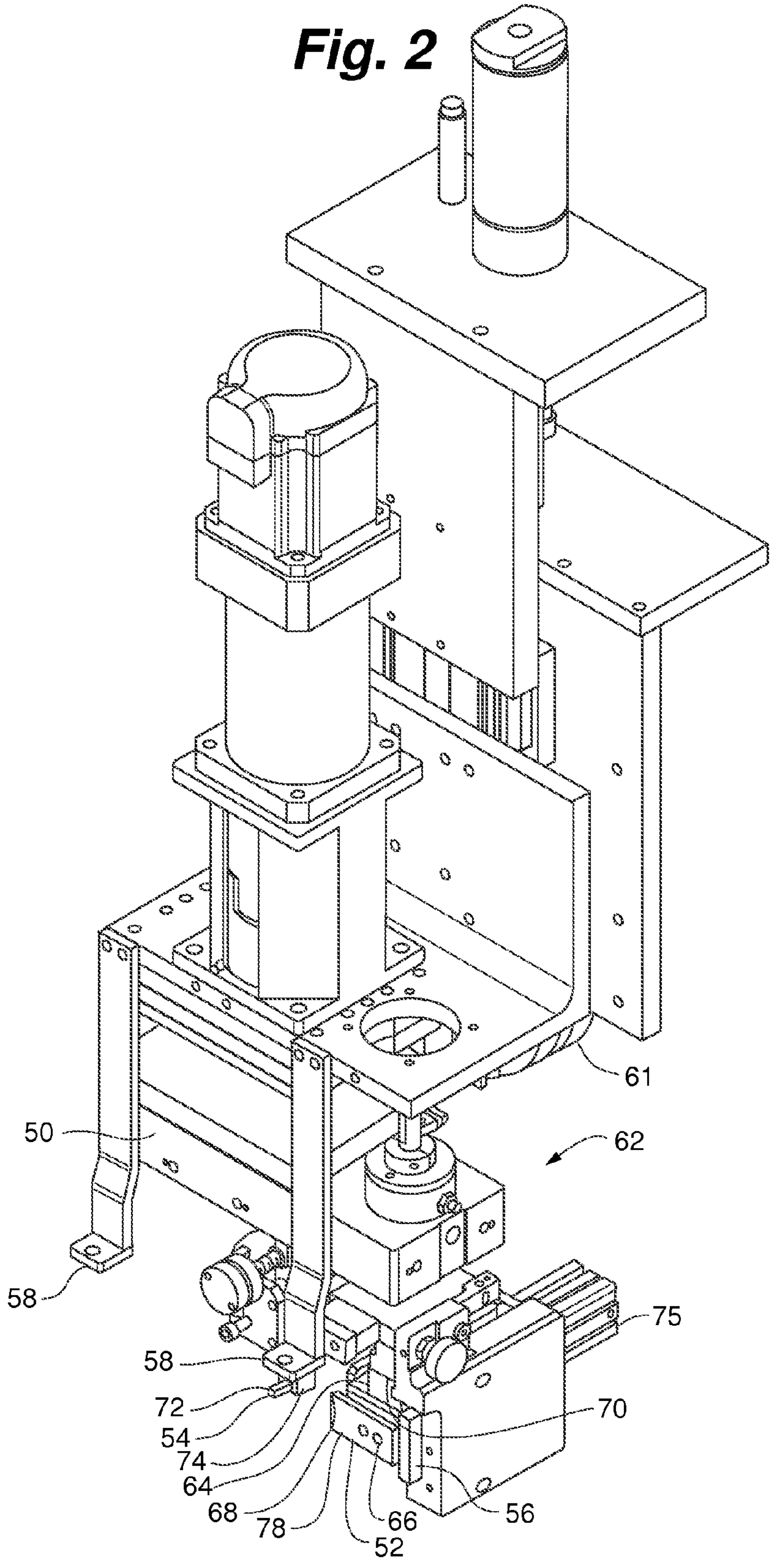
FIG. 2 is a perspective view of a fixed head sealant applicator in accordance with an embodiment of the invention.
Figure 3:
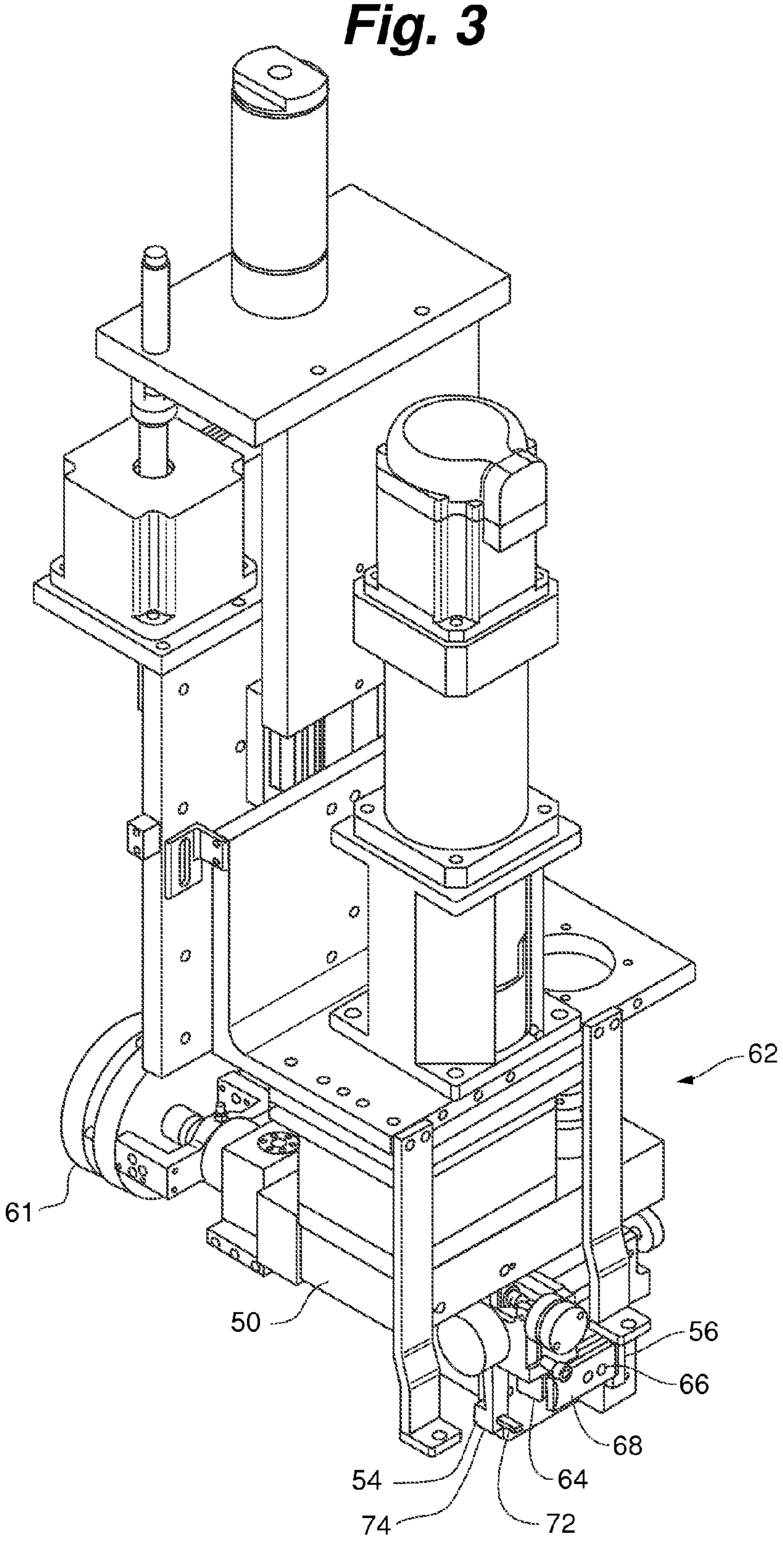
FIG. 3 is another perspective view of the fixed head edge sealant dispenser of FIG. 2.

Referring to FIGS. 2 and 3, single nozzle sealant dispenser 62 in accordance with the invention is depicted. Fixed head sealant dispenser 26, in an example embodiment, includes high volume metering pump 50, dispensing nozzle 52, depth sensor 54, dam 56, proximity sensors 58 and movement encoder 60.

High volume metering pump 50 in an example embodiment, is a positive displacement gear metering pump. Other types of metering pumps may be used as well. In an example embodiment, high volume metering pump 50 is selected to have a capacity of four to six times greater than the maximum expected flow rate for fixed edge IGU edge sealer 20. In this way high volume metering pump 50 can operate at 15 to 25 percent of its maximum capacity, which increases pump life.

For example, in one embodiment of the invention, a fifteen gallon per minute pump is utilized so that it operates at thirty to fifty rpm instead of its maximum capacity of approximately two hundred rpm. High volume metering pump 50 is coupled to sealant supply 30 in which sealant is supplied under pressure to high volume metering pump 50. High volume metering pump 50 is also coupled to dispensing nozzle 52. Electrically or pneumatically controlled dispensing valves 61 may be interposed between high volume metering pump 50 and dispensing nozzle 52.

In one example embodiment, dispensing nozzle 52 generally includes body 64, which defines dispensing orifice 66, ski 68 and quick change coupling 70. Dispensing nozzle 52 will be further described below.

Figure 4:
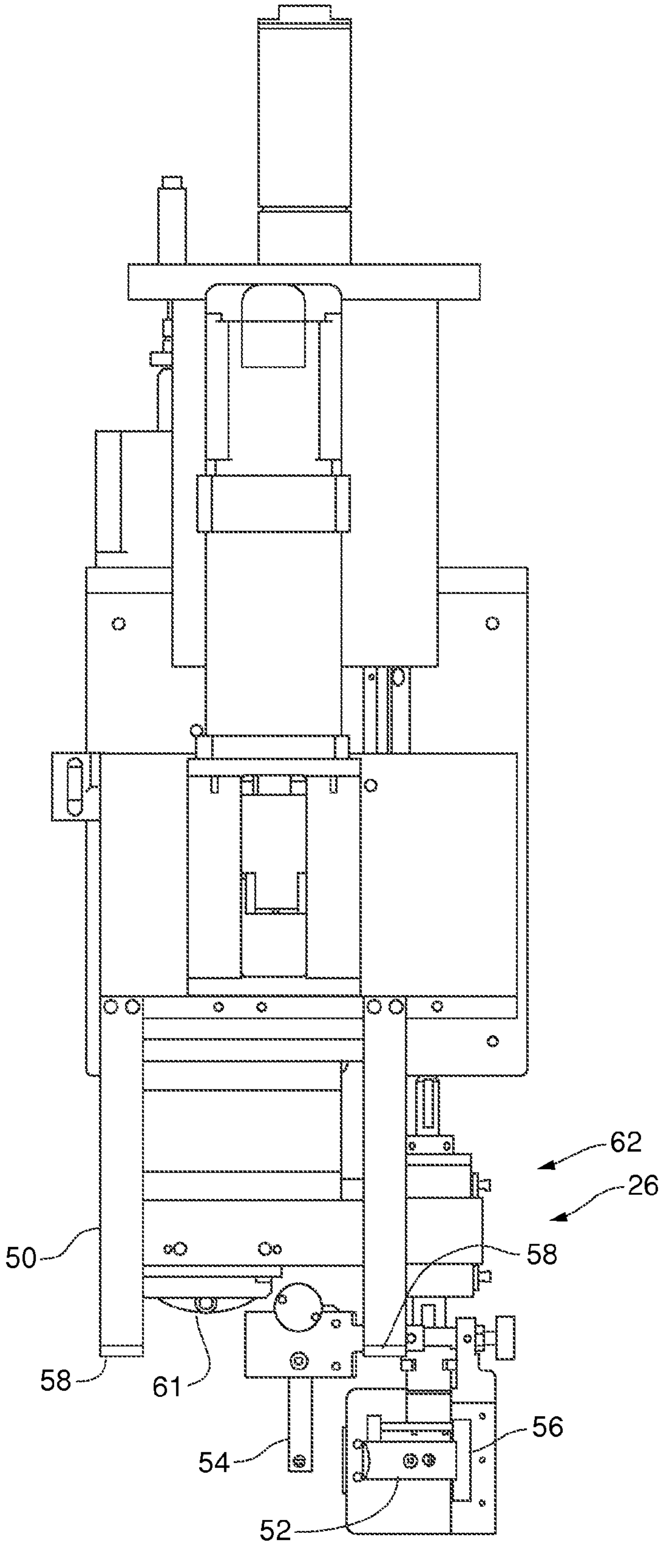
FIG. 4 is a front elevational view of the fixed head edge sealant dispenser of FIGS. 2 and 3.
Figure 5:
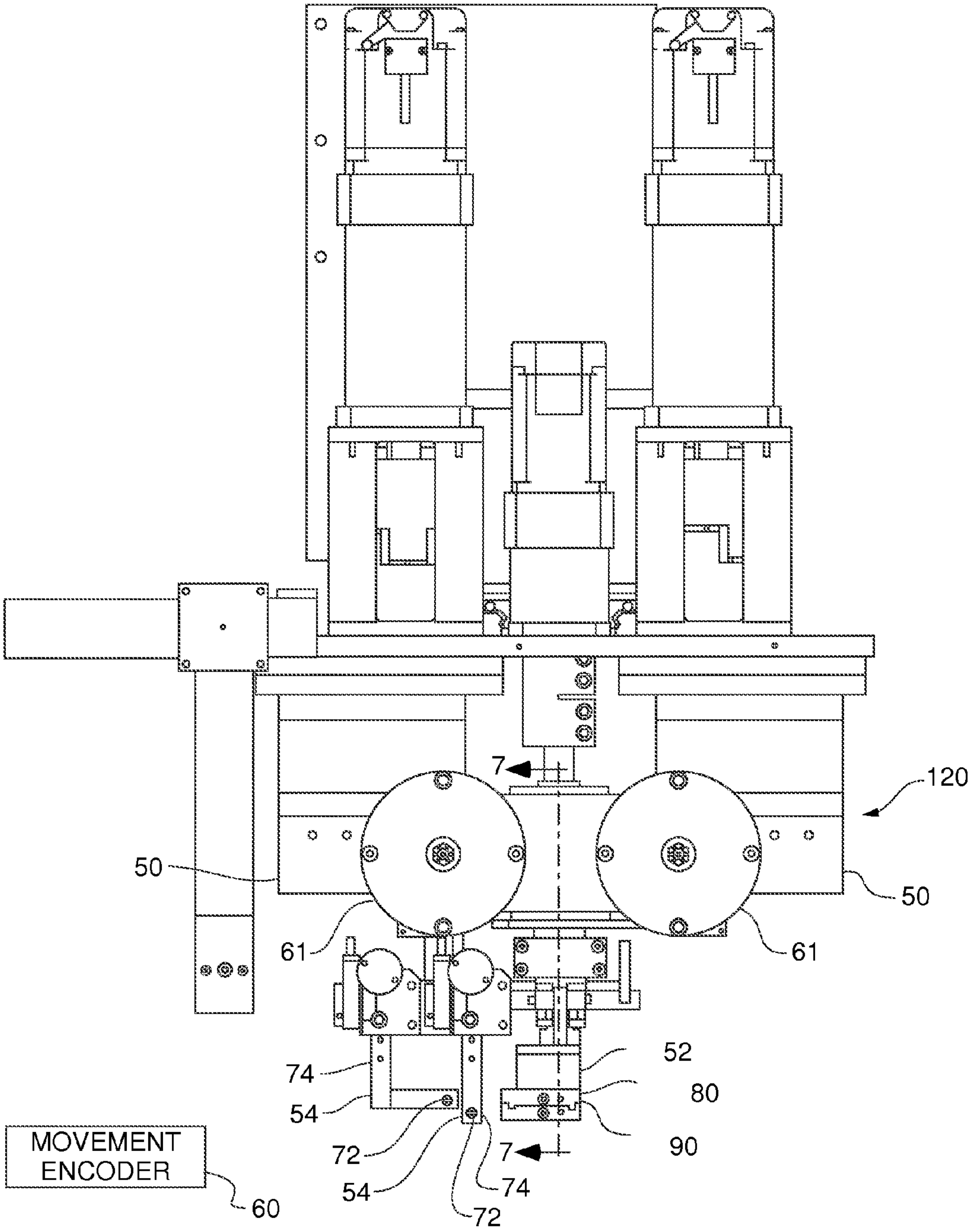
FIG. 5 is a front elevational view of a fixed head edge sealant dispenser with dual dispensing nozzles for triple glazed insulated glass units in accordance with an embodiment of the invention.
Figure 6:
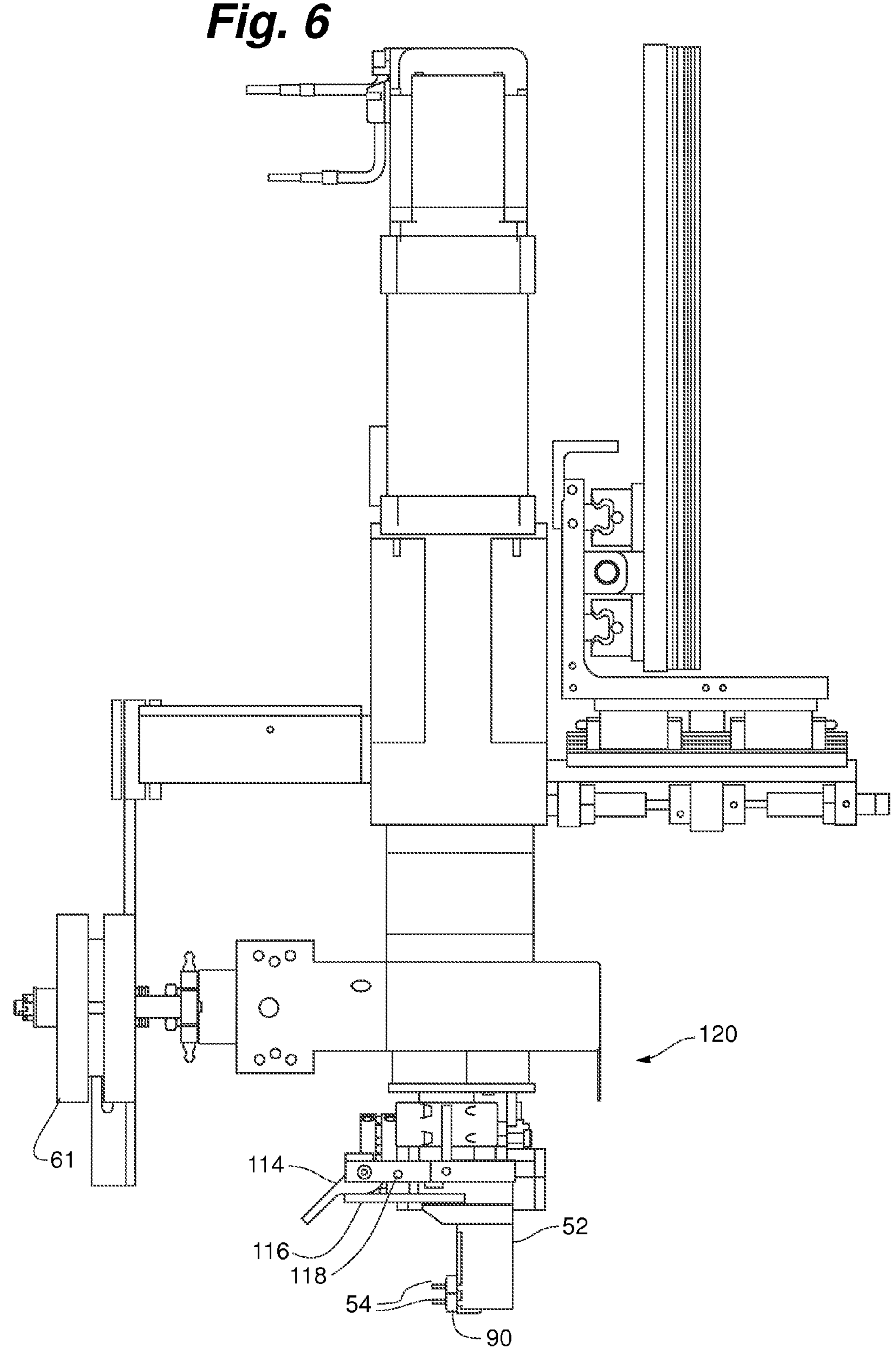
FIG. 6 is a side elevational view of a fixed head edge sealant dispenser depicted in FIG. 5 with certain parts removed for clarity.

Referring to FIGS. 2-4, depth sensor 54 is positioned to a side of dispensing nozzle 52 from which IGUs to be sealed will be presented. In an example embodiment of the invention, depth sensor 54 includes probe 72 coupled to arm 74. Depth sensor 54 is adapted to measure the depth that a spacer in an insulated glass unit is inset relative to the edge of the glass panes to which the spacer is attached. Depth sensor 54 is operably coupled to controller 28 to provide depth information thereto. Depth sensor 54 may include but is not limited to mechanical, electrical, optical or ultrasound depth sensors.

Referring to FIGS. 2-4, dam 56 is depicted in a retracted position. Referring to FIGS. 10-13, dam 56 is depicted in an extended position. Dam 56 is shiftable between the extended position and the retracted position by actuation of hydraulic, pneumatic or electrical actuators 75. Dam 56 extends outwardly when in the extended position, generally perpendicular to ski 68 of dispensing nozzle 52. Dam 56 may be formed of metal or another material resistant to heat. Dam 56 is located to be directly adjacent to ski 68 and to form a generally right angle thereto.

Proximity sensors 58 are adapted to sense the presence of an insulated glass unit on table 22 near to fixed head sealant dispenser 26. One of proximity sensors 58 is located approximately at the location of dispensing nozzle 52. Another of proximity sensors 58 may be located significantly prior to dispensing nozzle 52 along the path at which an insulated glass unit is moved pass dispensing nozzle 52.

Referring again to FIG. 1, movement encoder 60 is located near fixed head sealant dispenser 26. Movement encoder 60 is adapted to sense the movement of an insulated glass unit moved on table 22 along fence 24 past fixed head sealant dispenser 26. Movement encoder 60 may include a rubber rimmed wheel 76. Rubber rimmed wheel 76 is positioned to contact a surface of an insulated glass unit that is located on IGU support structures 34 on table 22. Movement encoder 60 is adapted to sense movement of an insulated glass unit that is located on table 22 along and parallel to fence 24. Movement encoder 60 is operably coupled to controller 28 and provides data related to movement of an IGU.

In another example embodiment of the invention, movement encoder 60 may include pinch rollers (not shown) that contact the top and bottom of an insulated glass unit moved along fence 24. The pinch rollers (not shown) may be passive if the insulated glass unit is moved manually or may be active and powered to assist in movement of the insulated glass unit.

Referring to FIGS. 2-4, 8 and 9, dispensing nozzle 52 may include single dispensing nozzle 78 or dual dispensing nozzle 80. While single dispensing nozzle 78 has been described above, dual dispensing nozzle 80 will be described in greater detail with the understanding that most of the features of dual dispensing nozzle 80 also apply to single dispensing nozzle 78.

Figure 8:
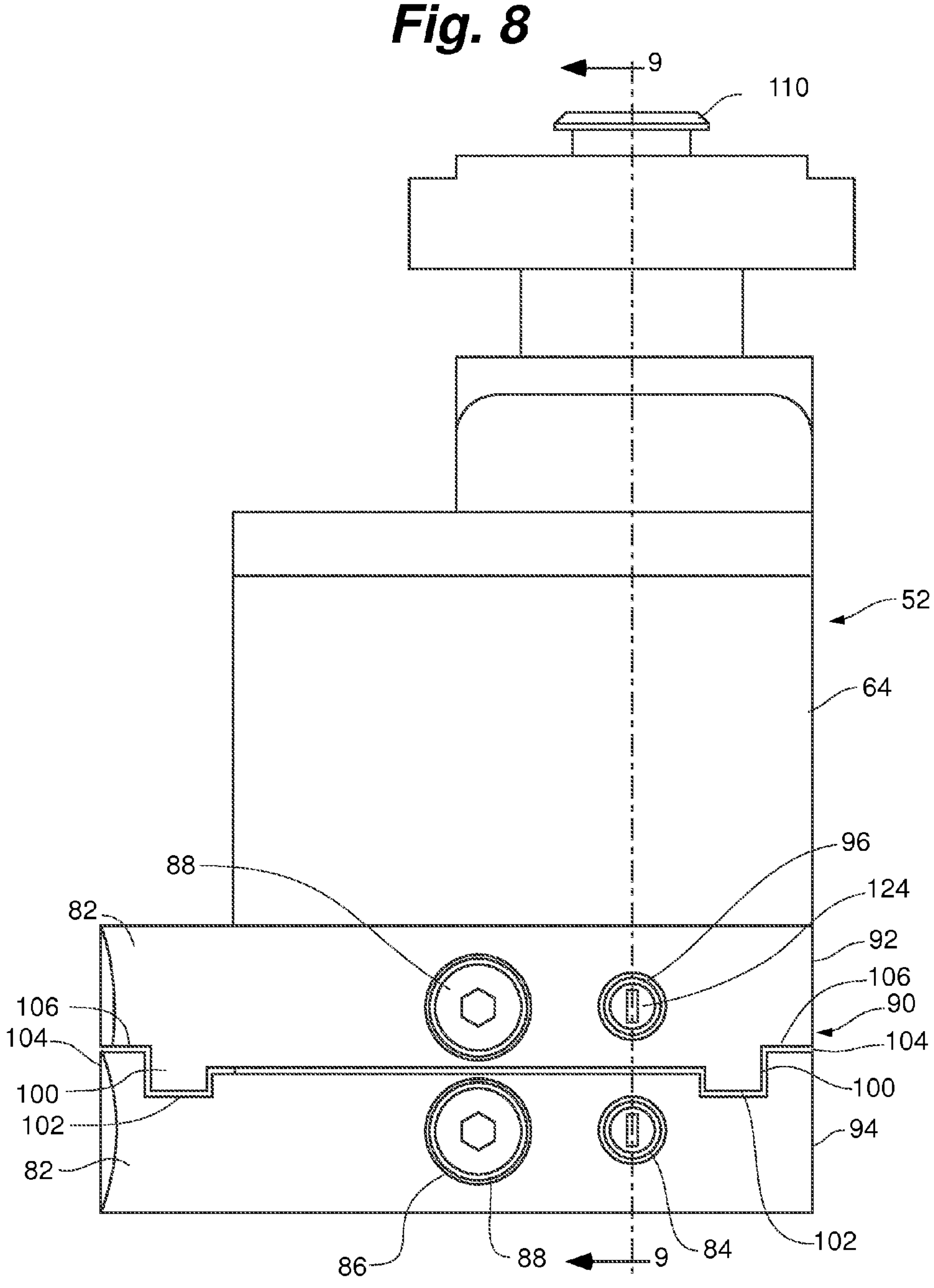
FIG. 8 is a front elevational view of a dual dispensing nozzle for triple glazing in accordance with an embodiment of the invention.
Figure 9:
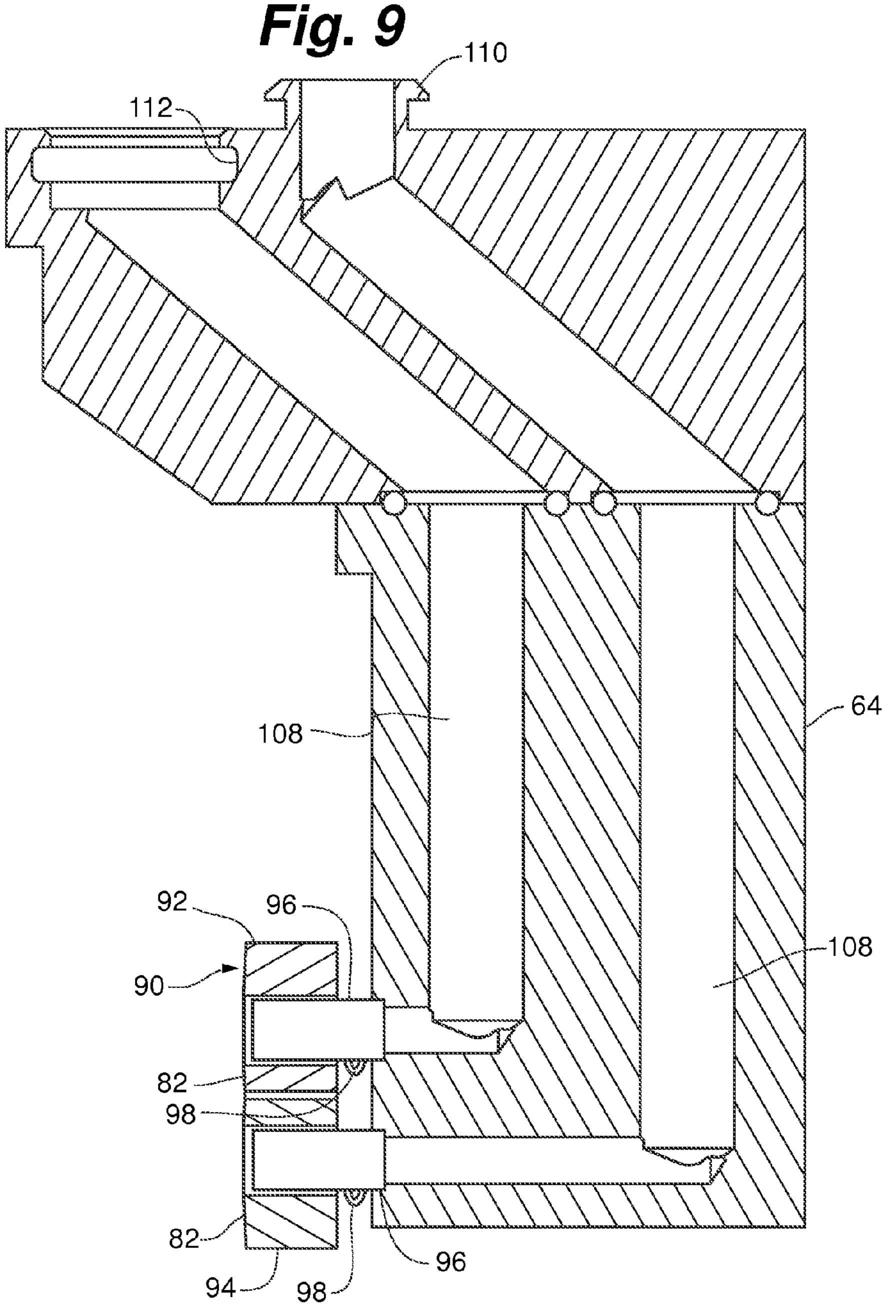
FIG. 9 is a sectional view of the dispensing nozzle of FIG. 8 taken along section line 9-9.
Figure 10:
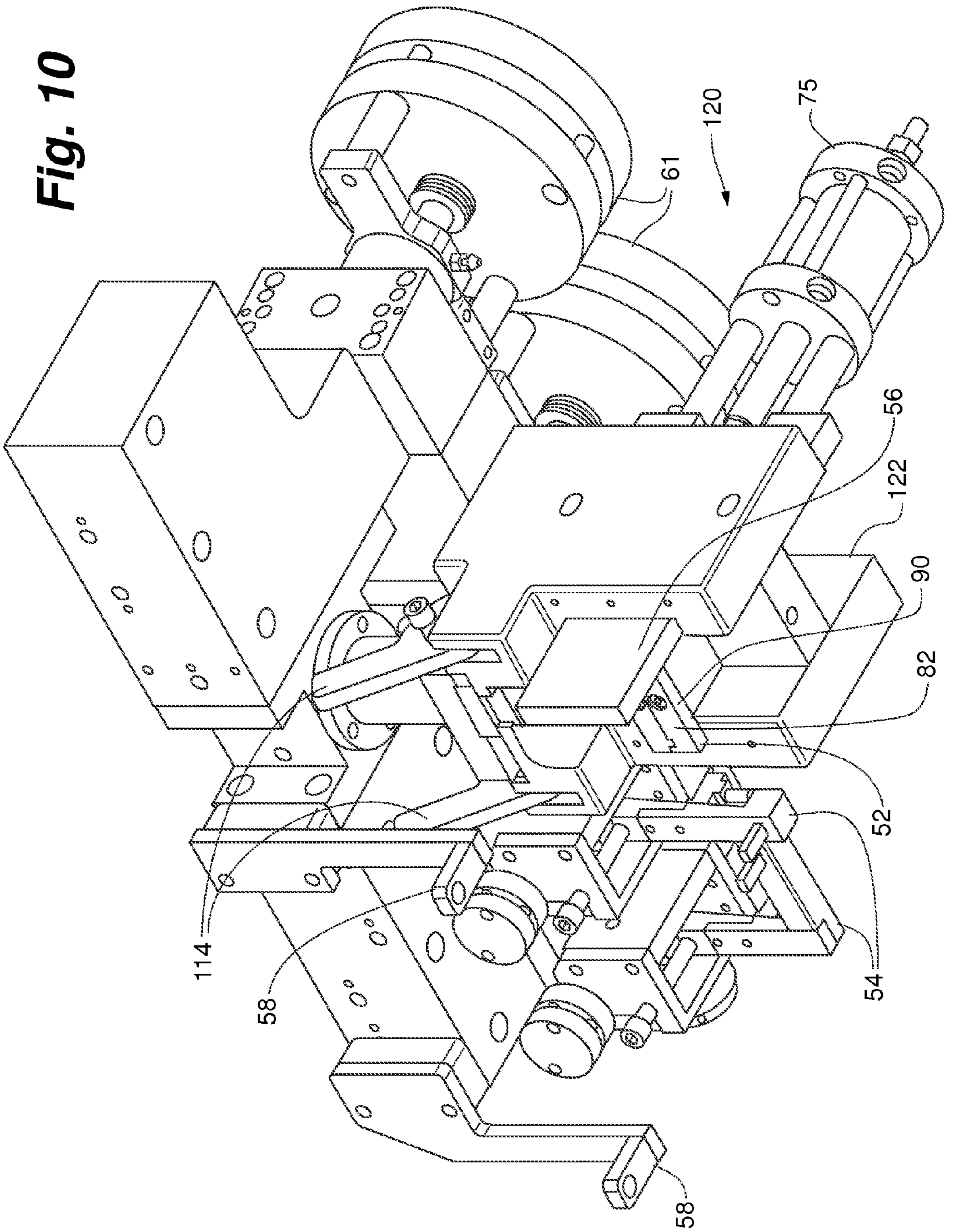
FIG. 10 is a perspective view of the dual fixed head sealant dispenser of FIG. 5 with a dam in the extended position.
Figure 11:
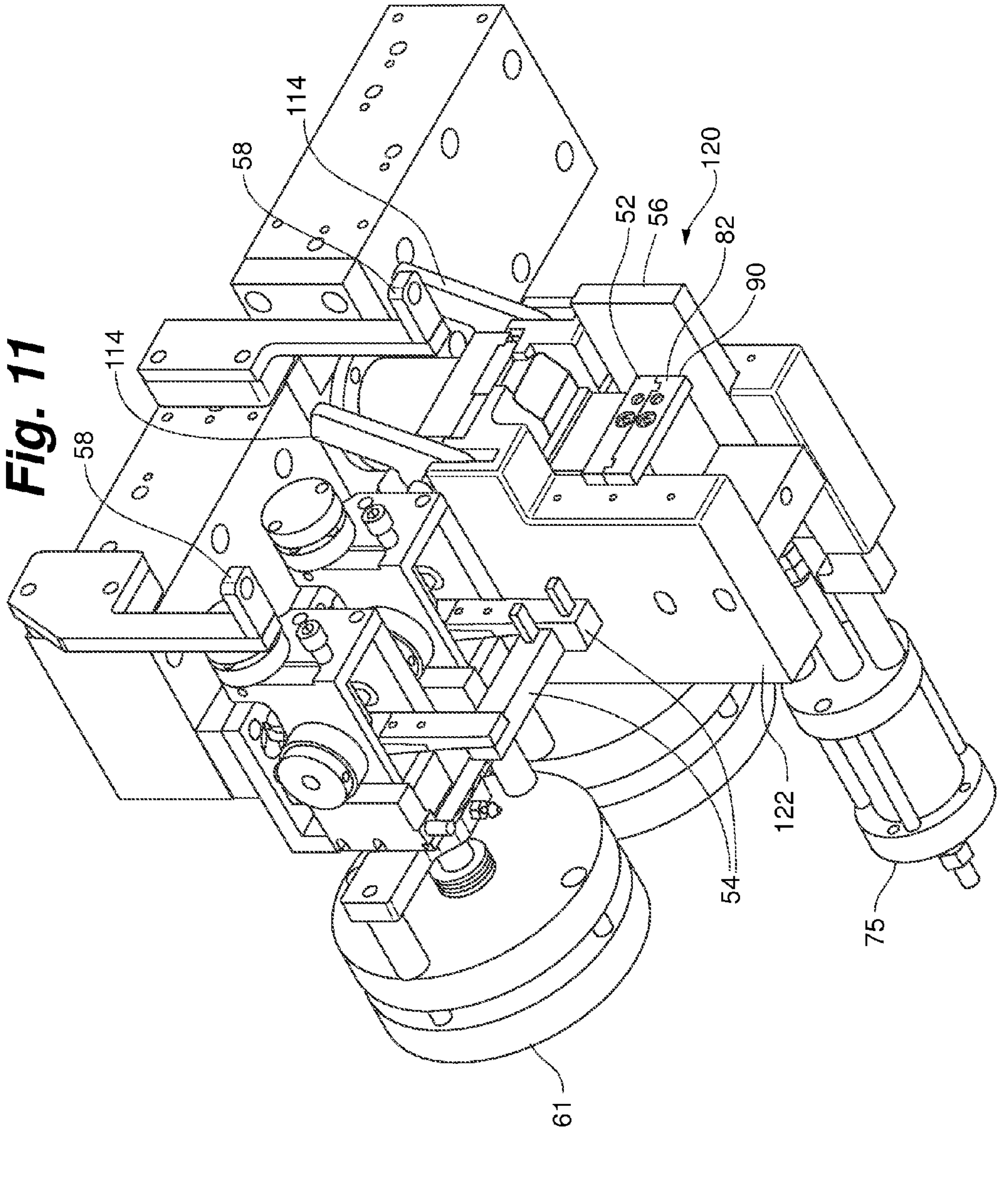
FIG. 11 is another perspective view of the dual fixed head sealant dispenser of FIG. 10.
Figure 12:
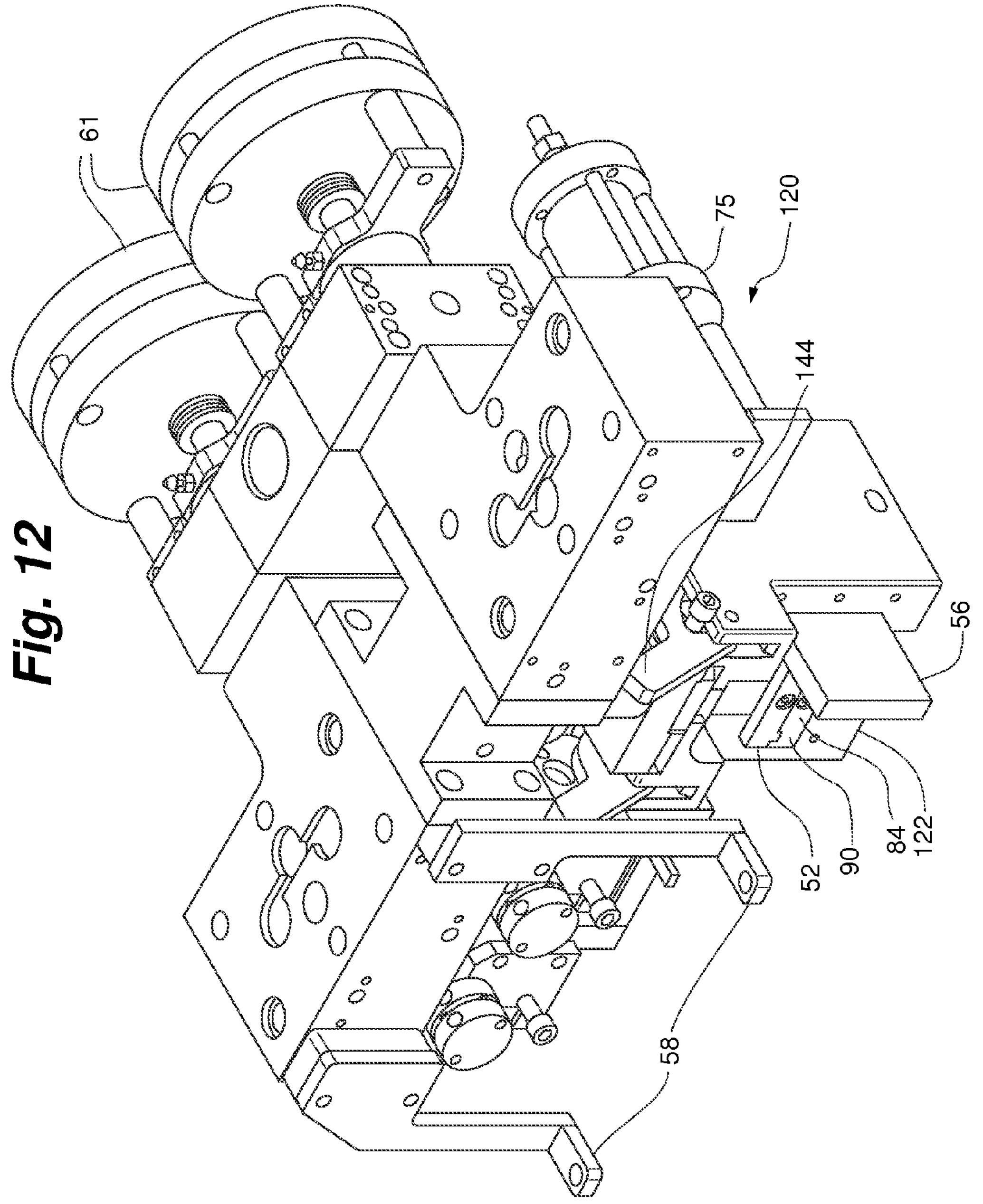
FIG. 12 is another perspective view of the dual fixed head sealant dispenser of FIG. 10.
Figure 13:
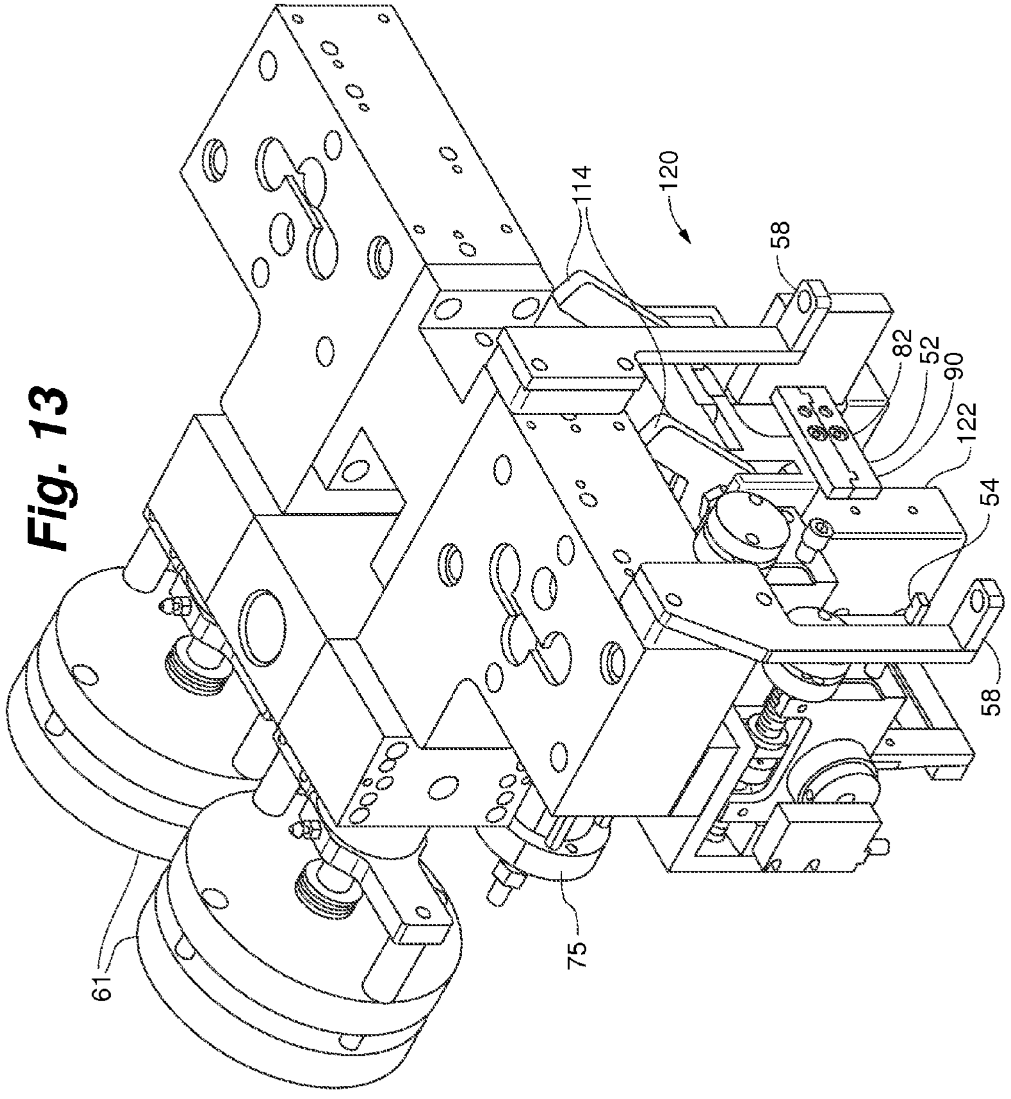
FIG. 13 is another perspective view of the dual fixed head sealant dispenser of FIG. 10.
Figure 1:
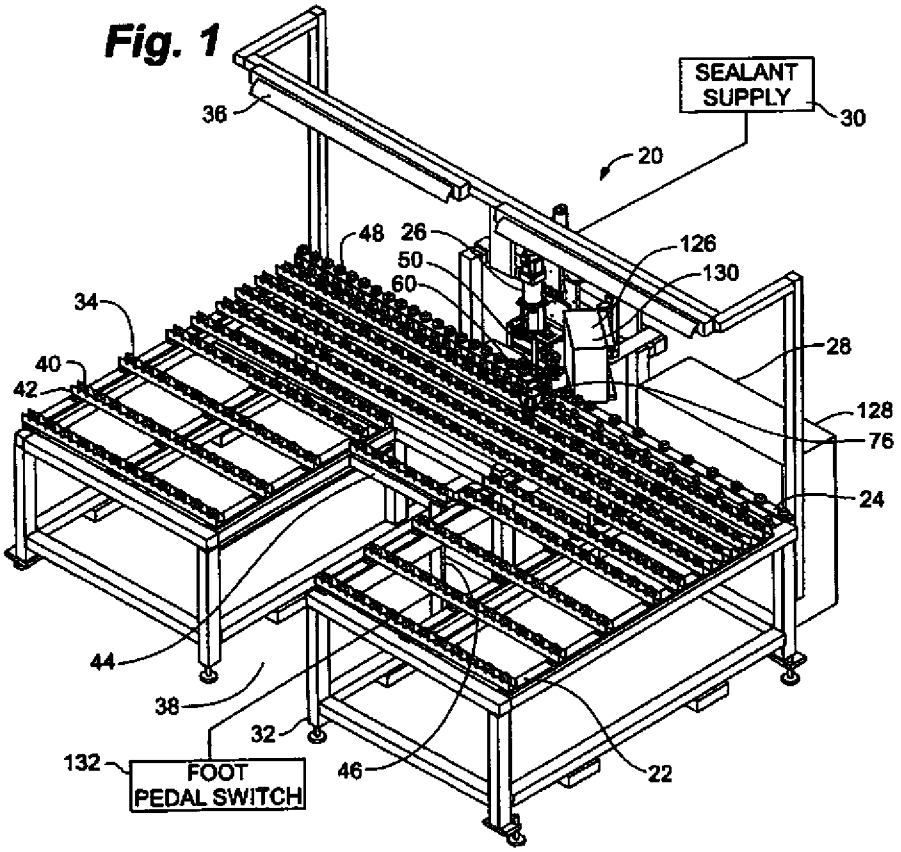
Figure 2:
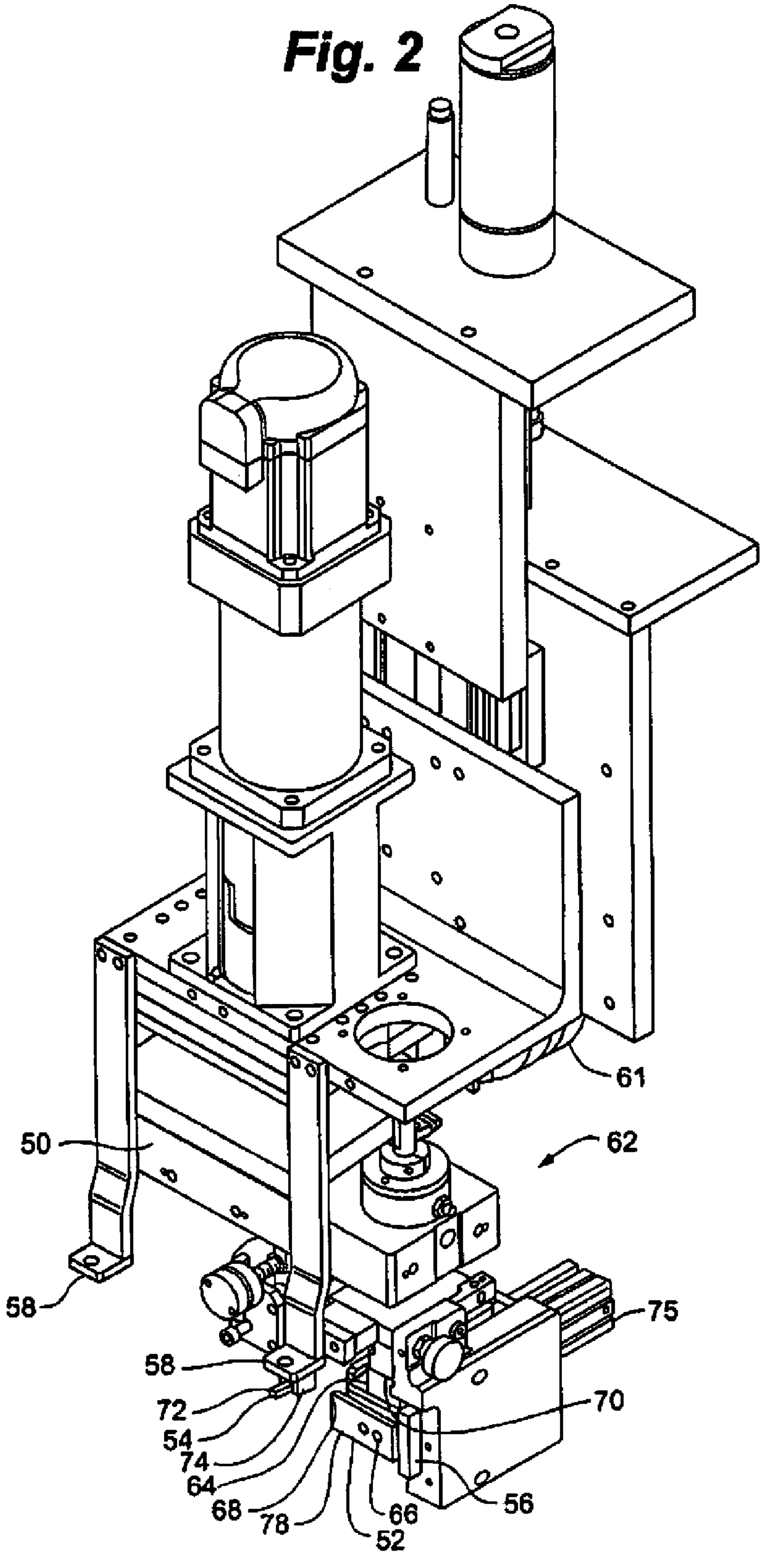
Figure 3:
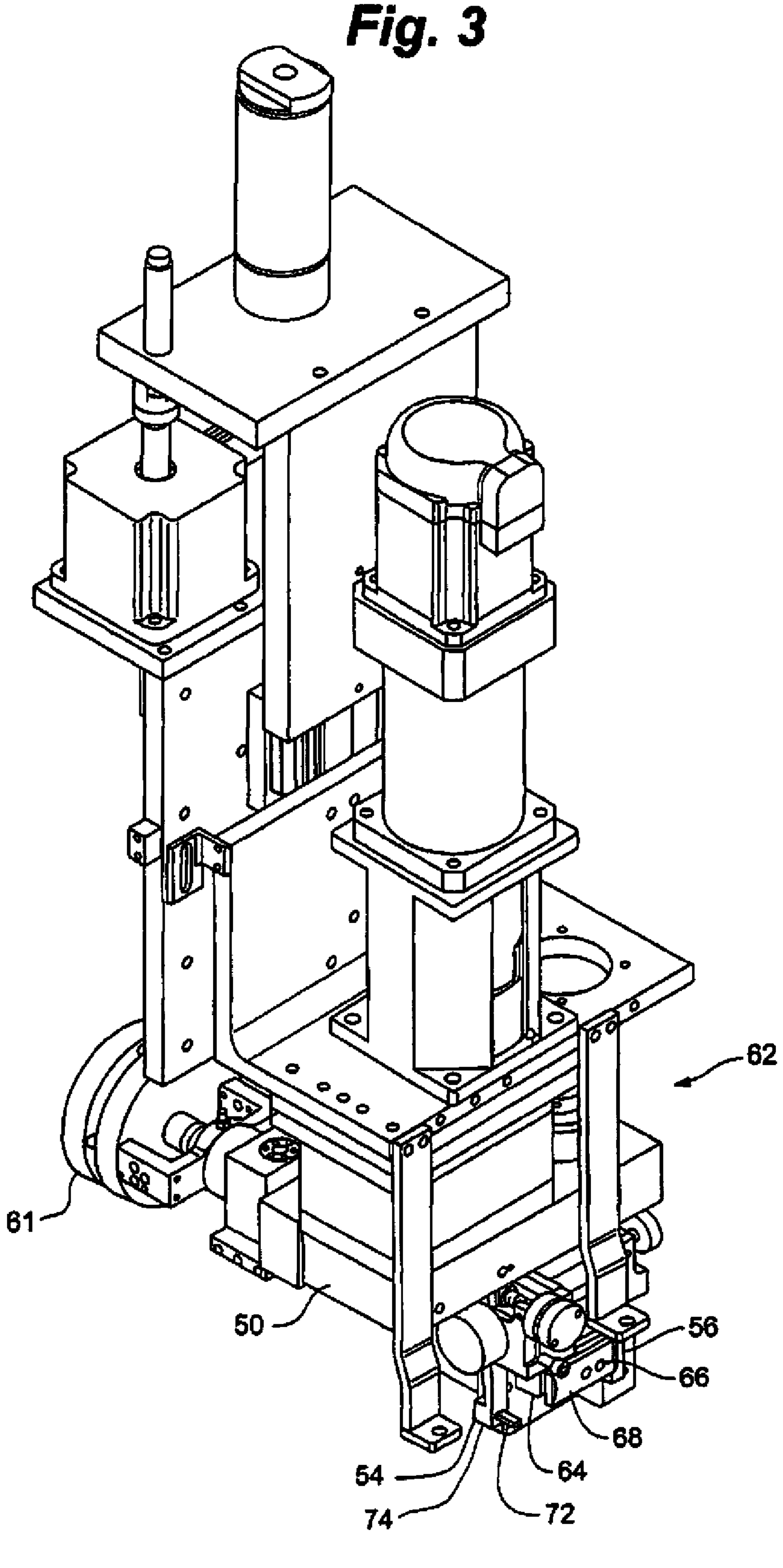
Figure 4:
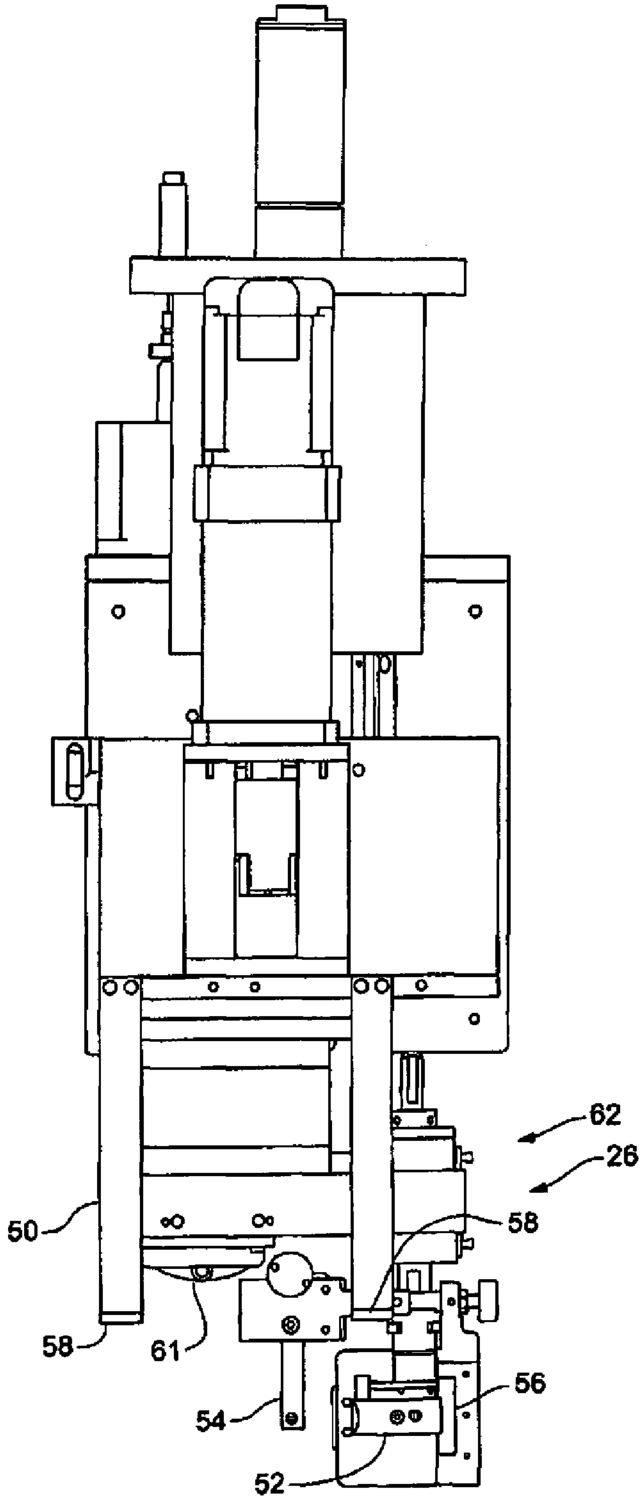
Figure 5:
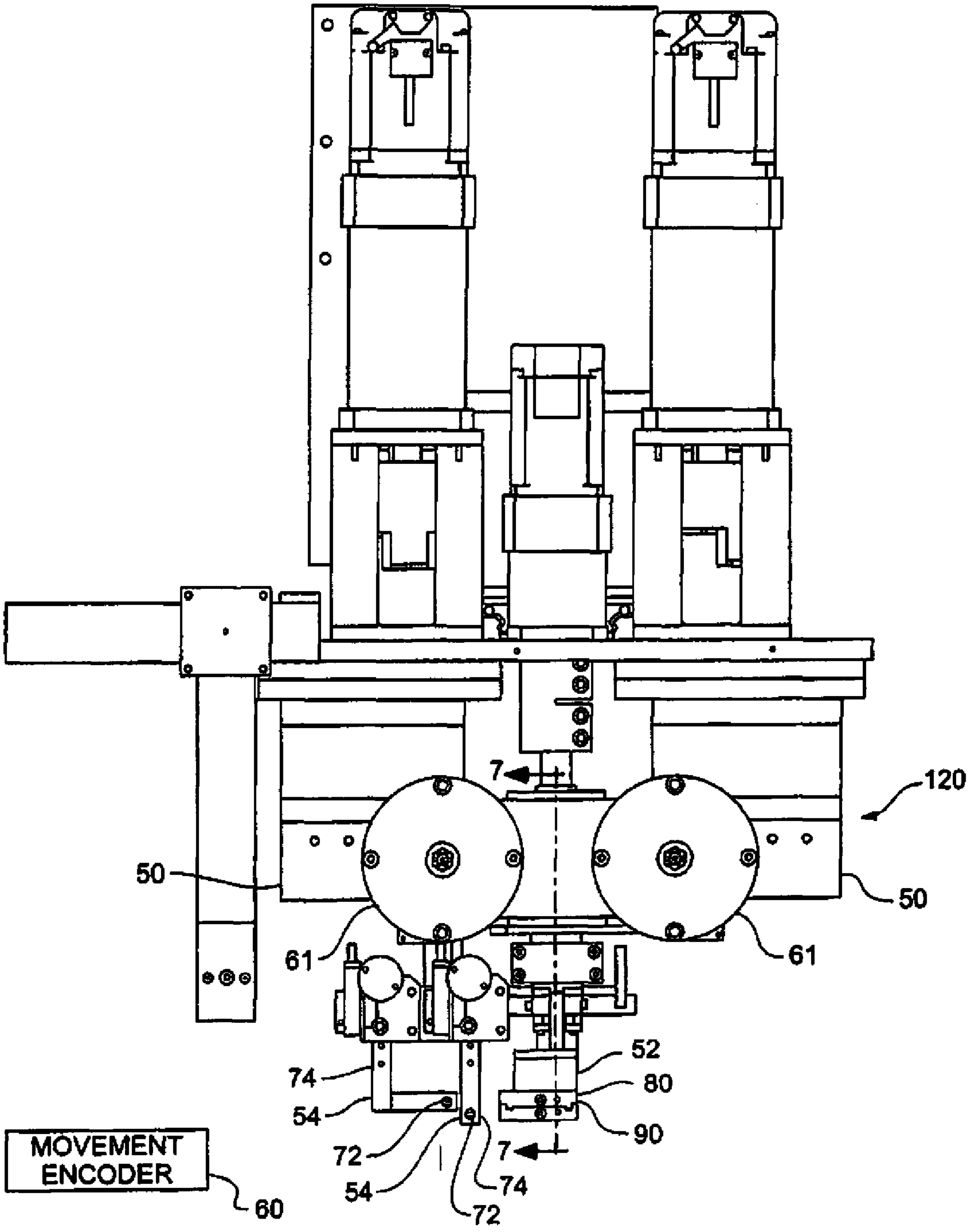
Figure 6:
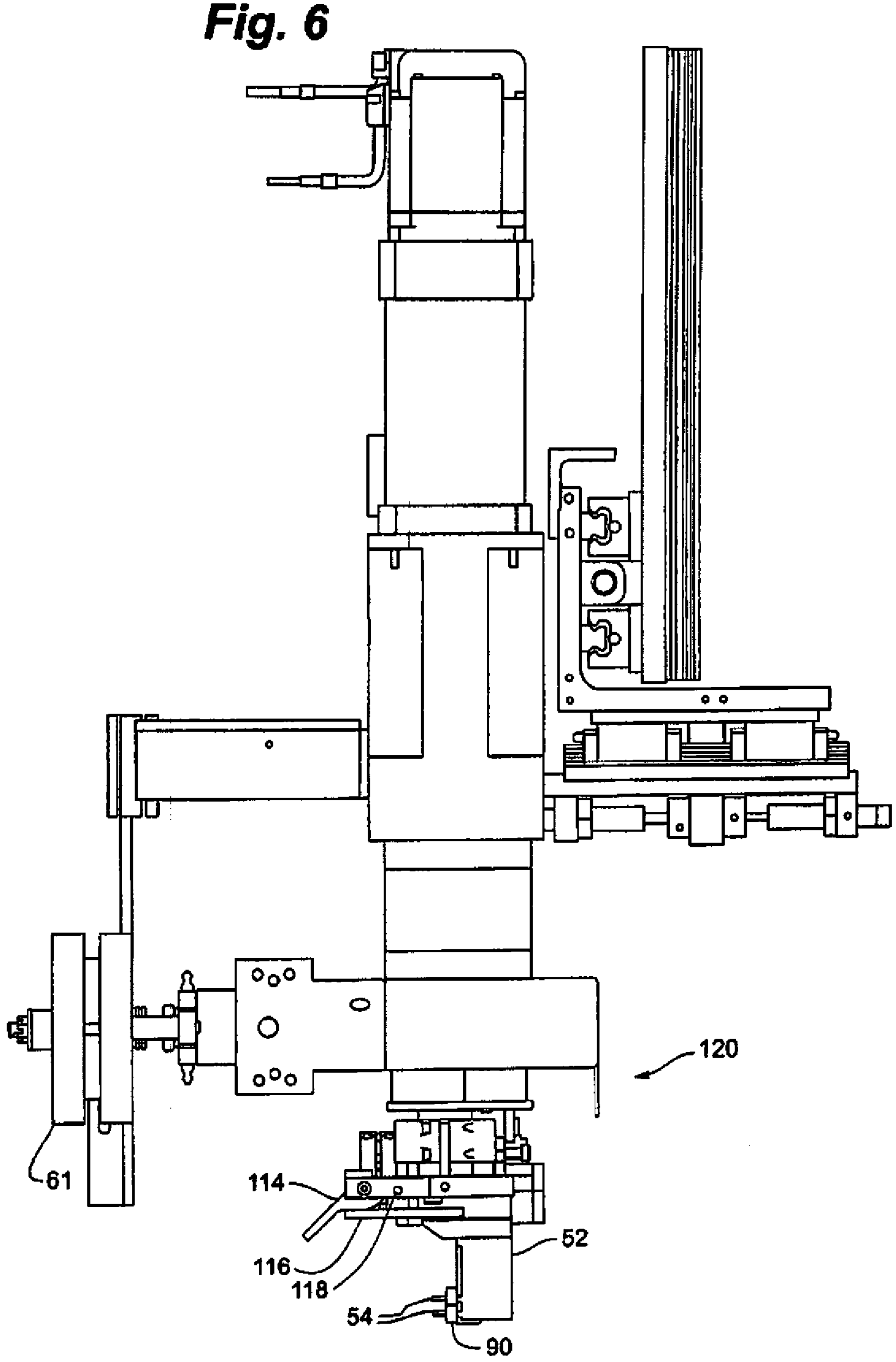
Figure 7:
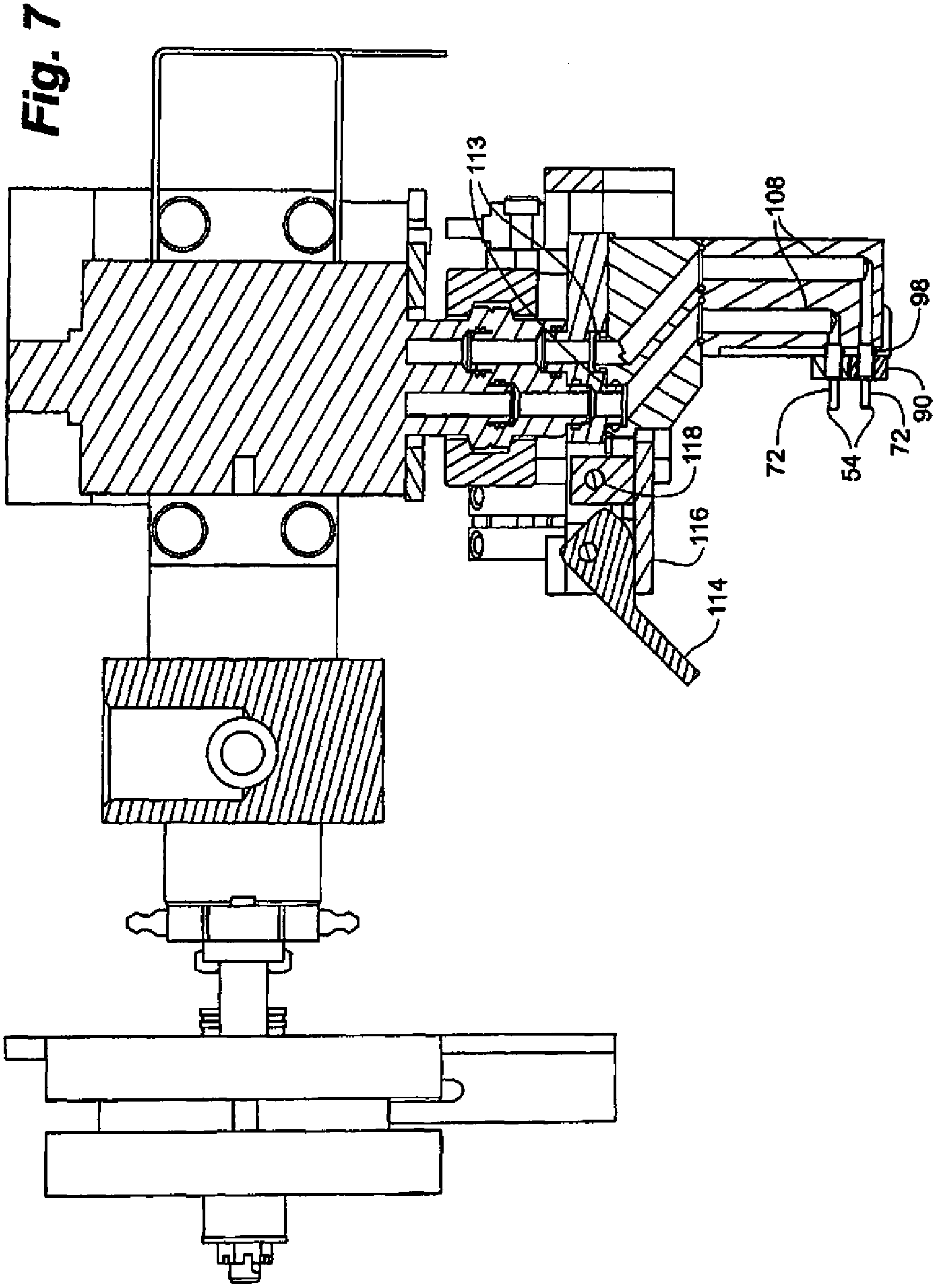
Figure 8:
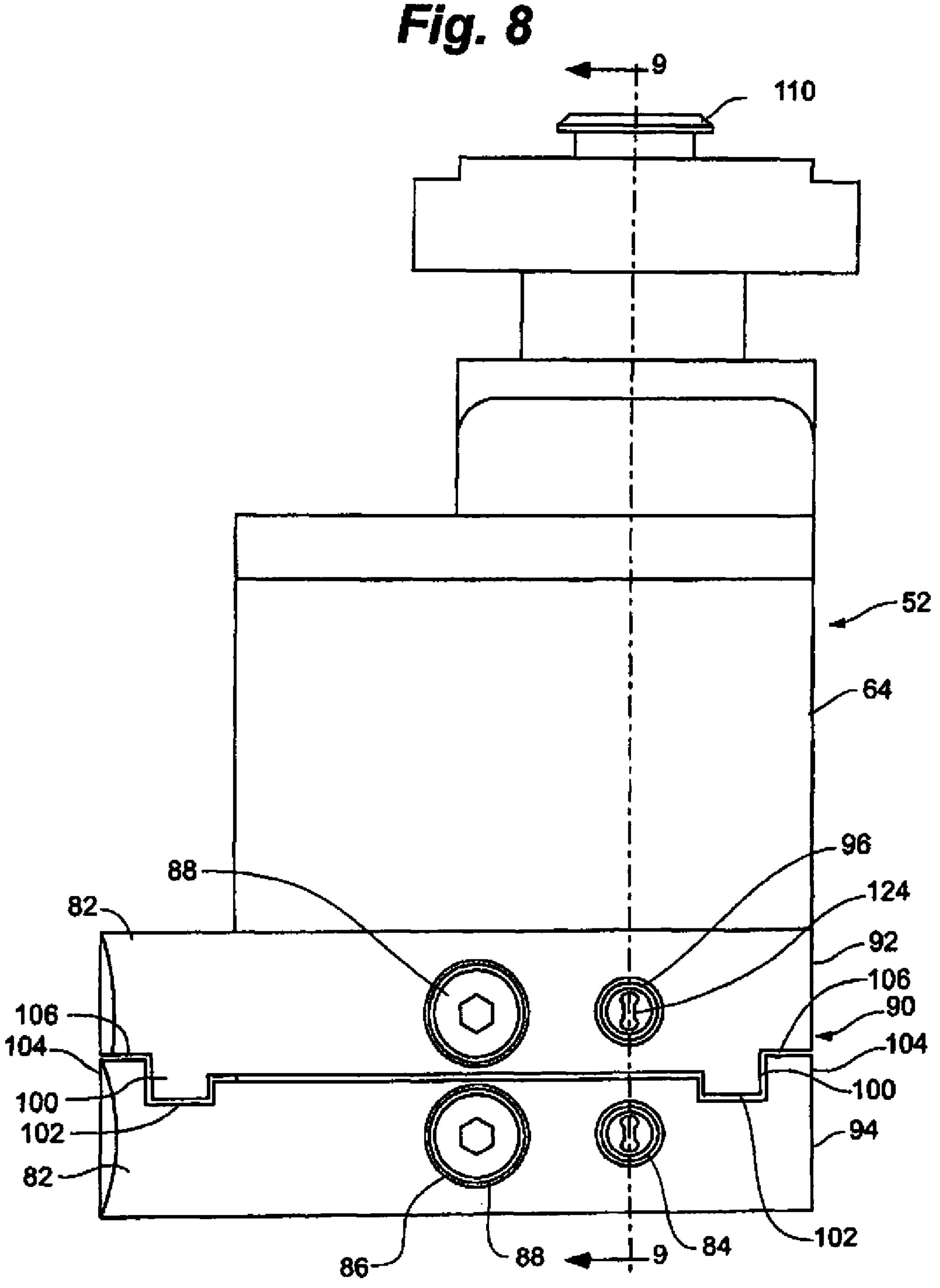
Figure 9:
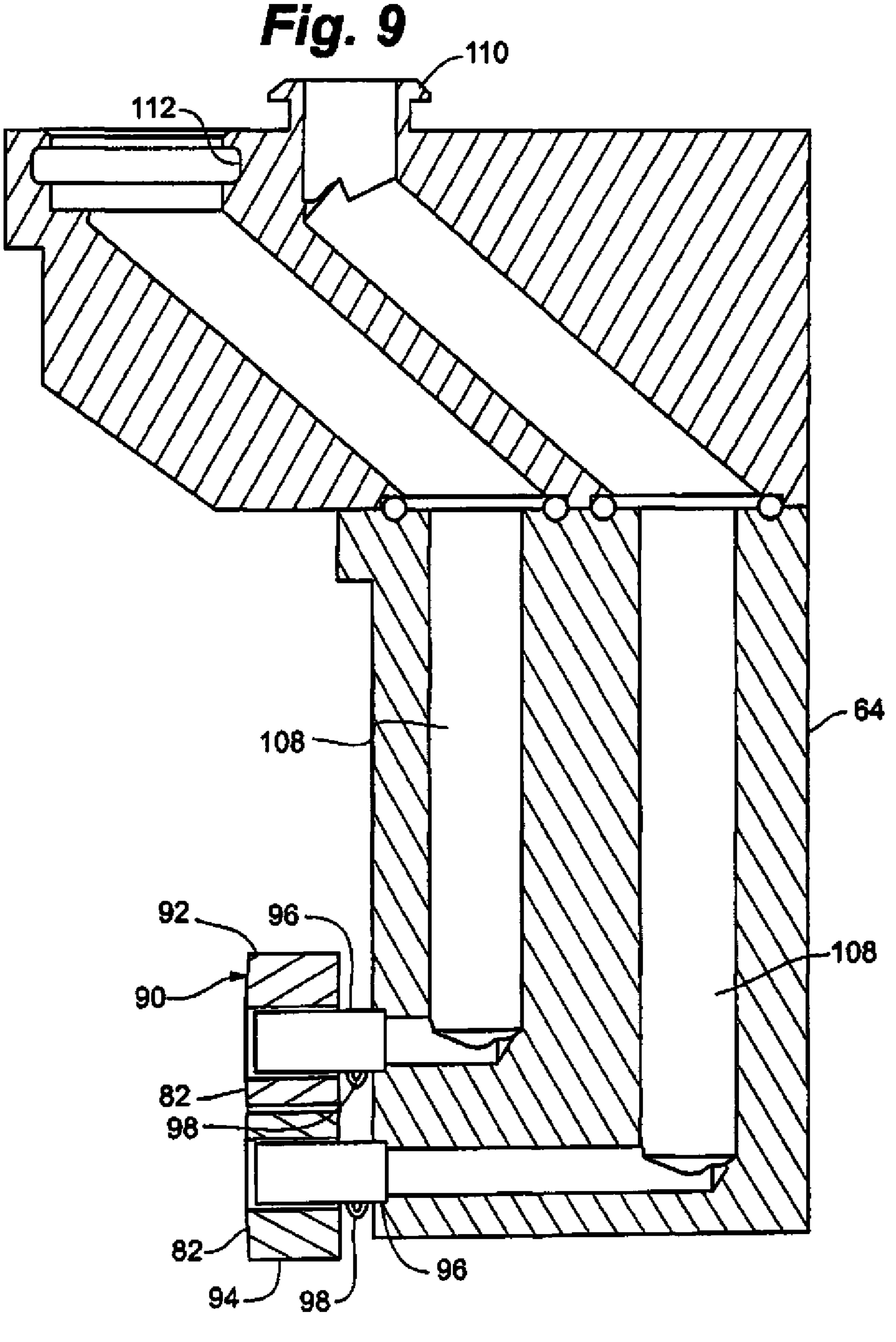
Figure 10:
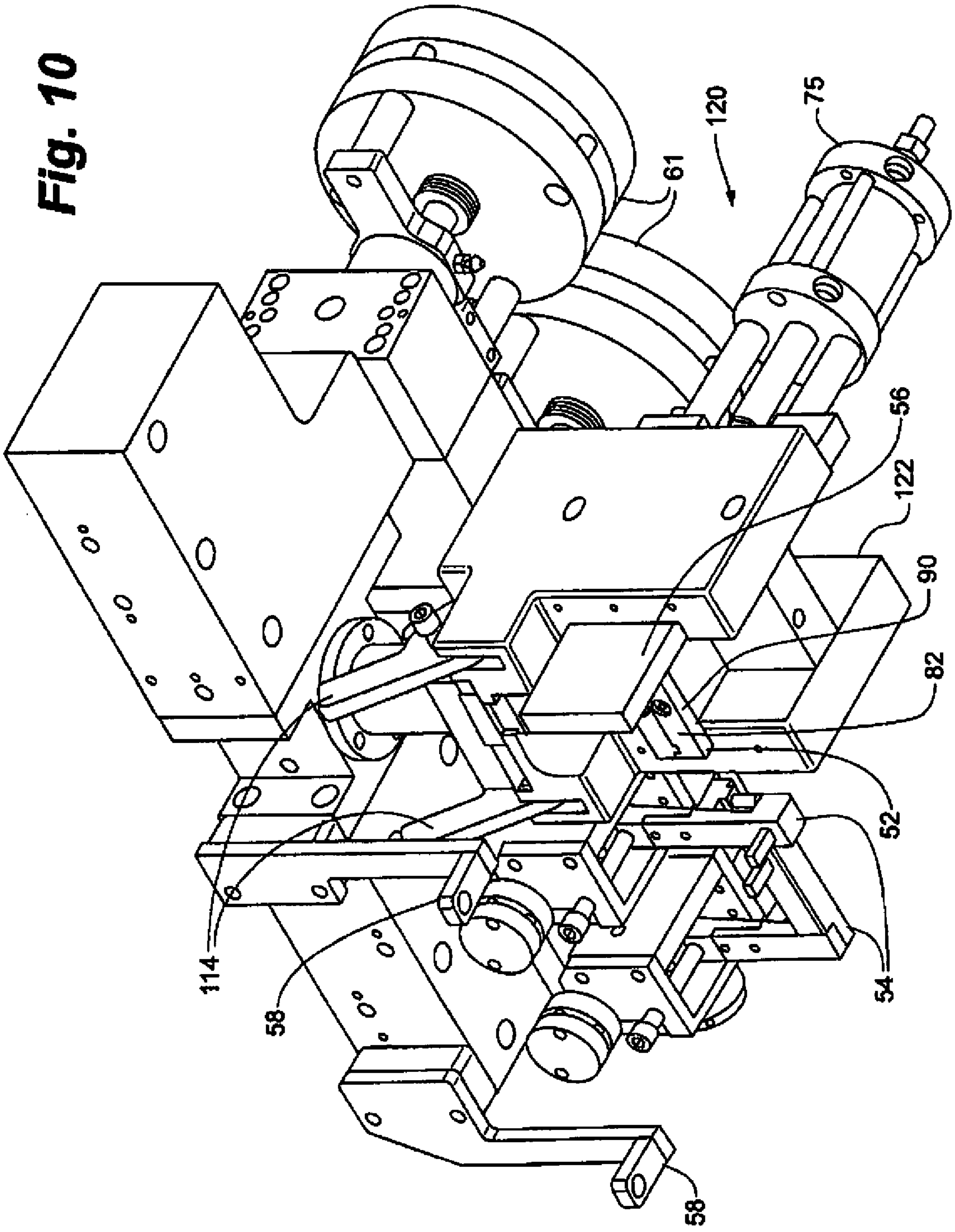
Figure 11:
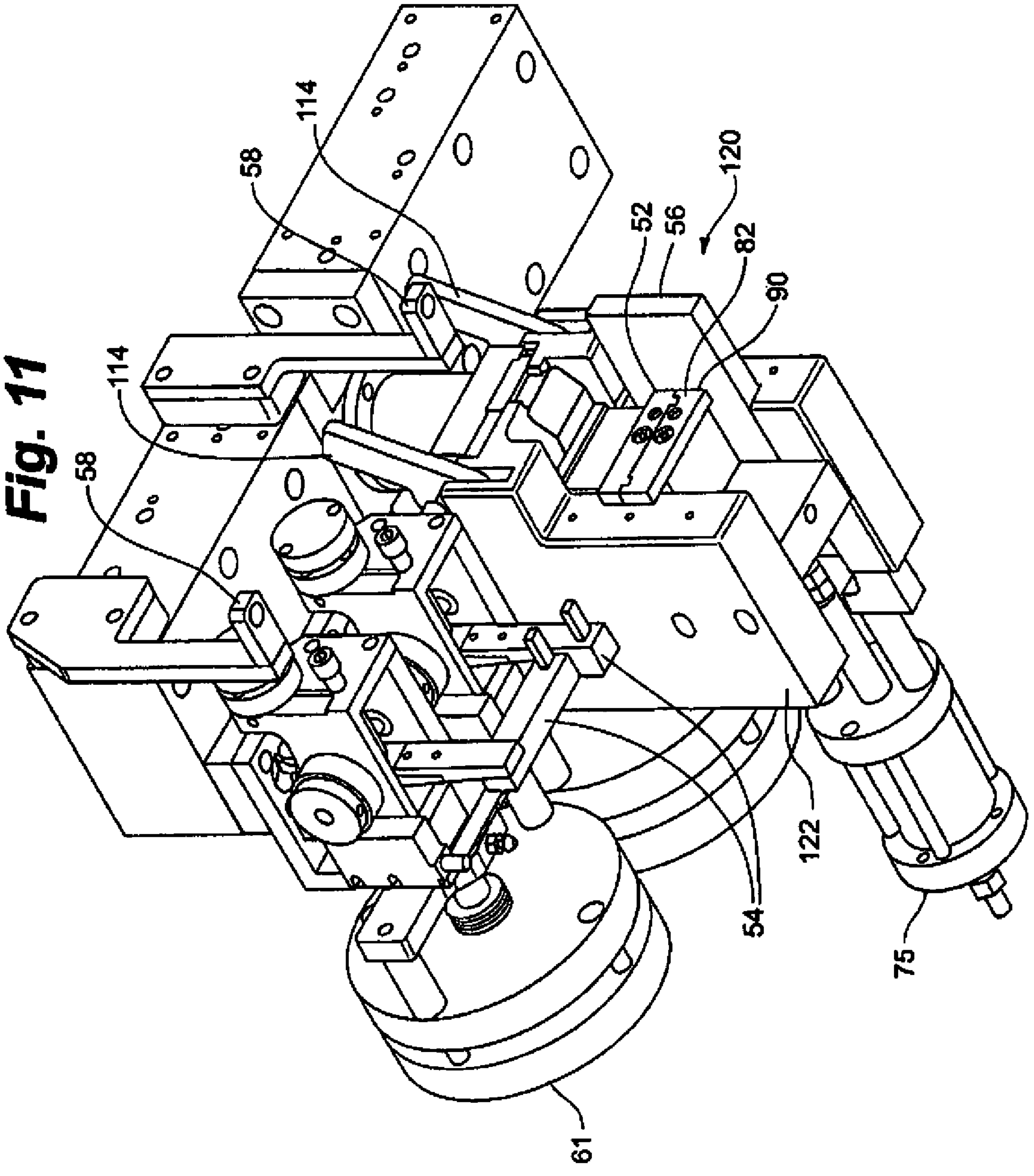
Figure 12:
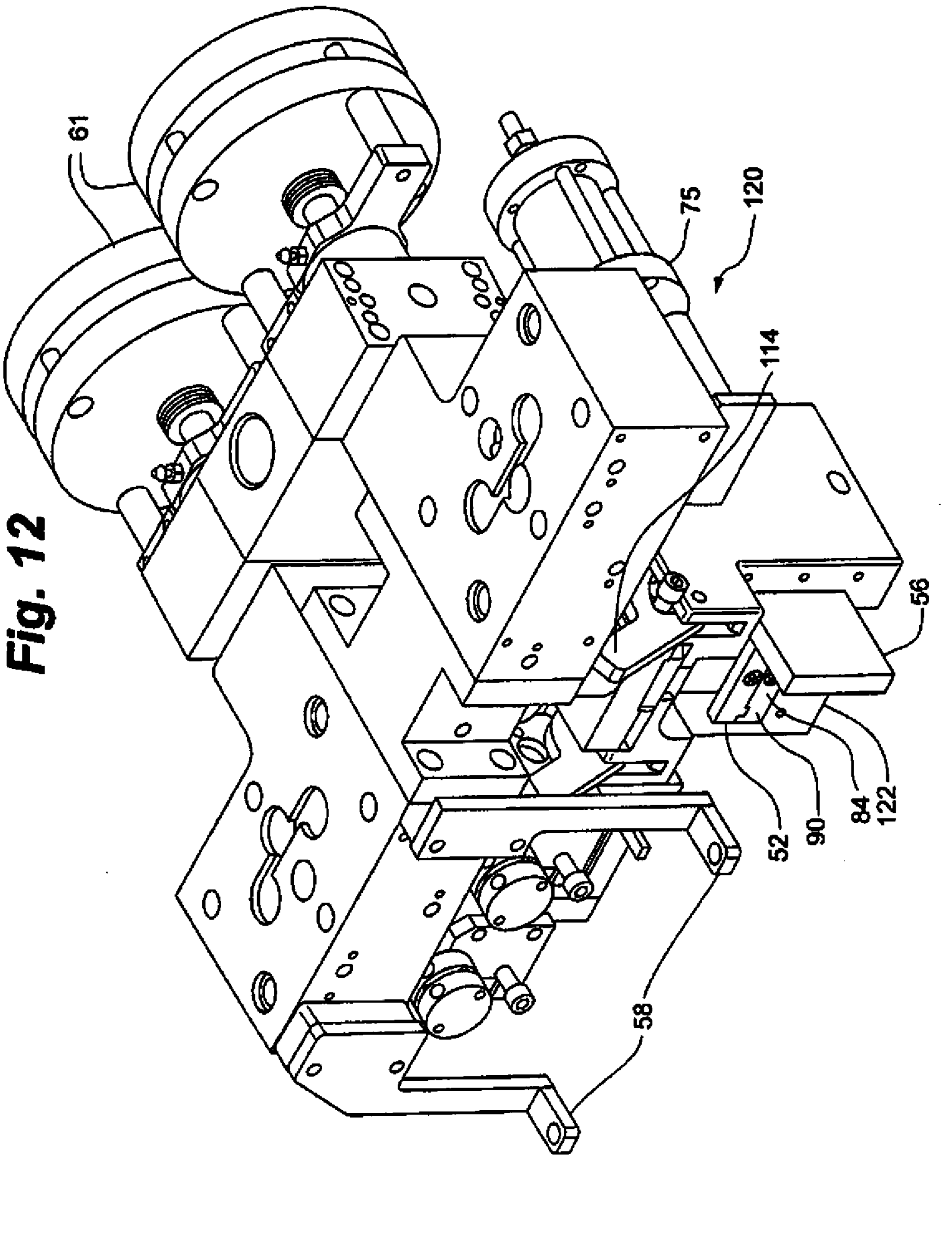
Figure 13:
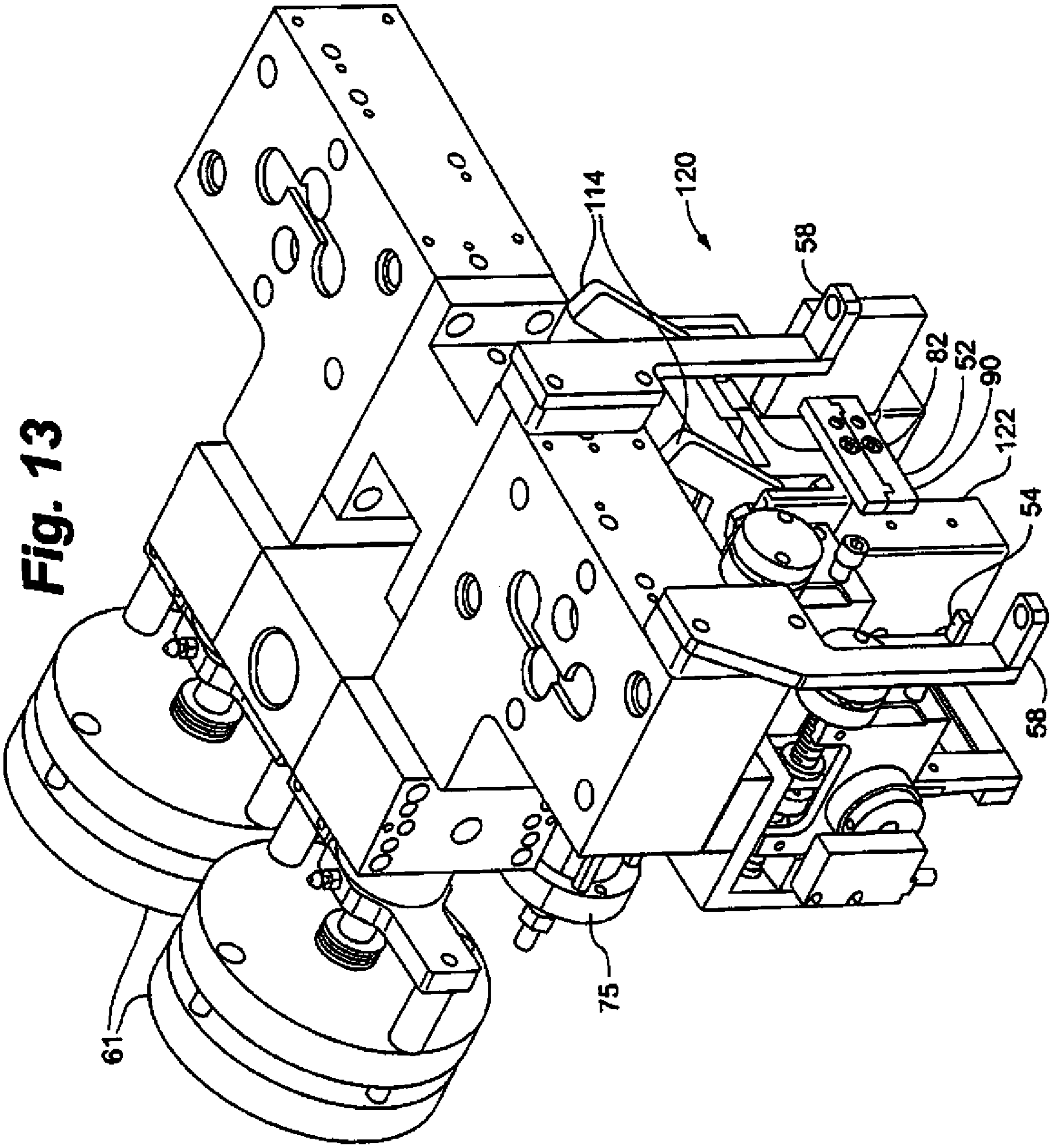

Referring to FIGS. 8 and 9, dual dispensing nozzle 80 includes two skis 68. Whether used in single dispensing nozzle 78 or dual dispensing nozzle 80, ski 68 presents IGU contact surface 82. IGU contact surface 82, according to one embodiment of the invention, is mirror polished to present a very smooth surface. As can be seen in FIGS. 2-4 and 9, IGU contact surface 82 is gently curved in a vertical direction. The inventor of the present invention has determined that a two to four inch radius of curvature works well for most IGU edge sealing operations.

Referring to FIGS. 2-4, in single dispensing nozzle 78, ski 68, presents dispense through aperture 84 and mounting aperture 86. Mounting aperture 86 is adapted to receive screw 88 therethrough. Mounting aperture 86 is configured to allow some movement of ski 68 relative to body 64 when screw 88 is tightened.

Referring to FIGS. 8 and 9, dual dispensing nozzle 80 includes dual ski assembly 90. Dual ski assembly 90 includes first ski 92 and second ski 94. Referring to particularly to FIG. 9, dual dispensing nozzle 80 presents nozzle tubes 96 extending outwardly therefrom. Dispense through aperture 84 surrounds nozzle tubes 96 when dual ski assembly 90 is installed on body 64. Spring 98 surrounds each of nozzle tubes 96 and biases dual ski assembly 90 outwardly away from body 64. In the case of single dispensing nozzle 78, a single spring 98 is present.

Referring to FIG. 8, first ski 92 interlocks with second ski 94 along their adjacent edges. First ski 92 presents downwardly extending tabs 100 which fit into tab slots 102 of second ski 94. Second ski 94 presents upwardly extending tabs 104 which fit into tab insets 106 of first ski 92. Similarly to ski 68, first ski 92 and second ski 94 each are mirror polished and have a two to four inch radius of curvature. First ski 92 and second ski 94 are free to move somewhat relative to body 64 of dual dispensing nozzle 80.

Referring to FIG. 9, body 64 of dual dispensing nozzle 80 defines therein sealant passages 108. Sealant passages 108 terminate at boss 110 and bore 112 which are adapted to mate with complementary structures 113 in this example embodiment to prevent reversed connection of dual dispensing nozzle 80.

Figure 7:
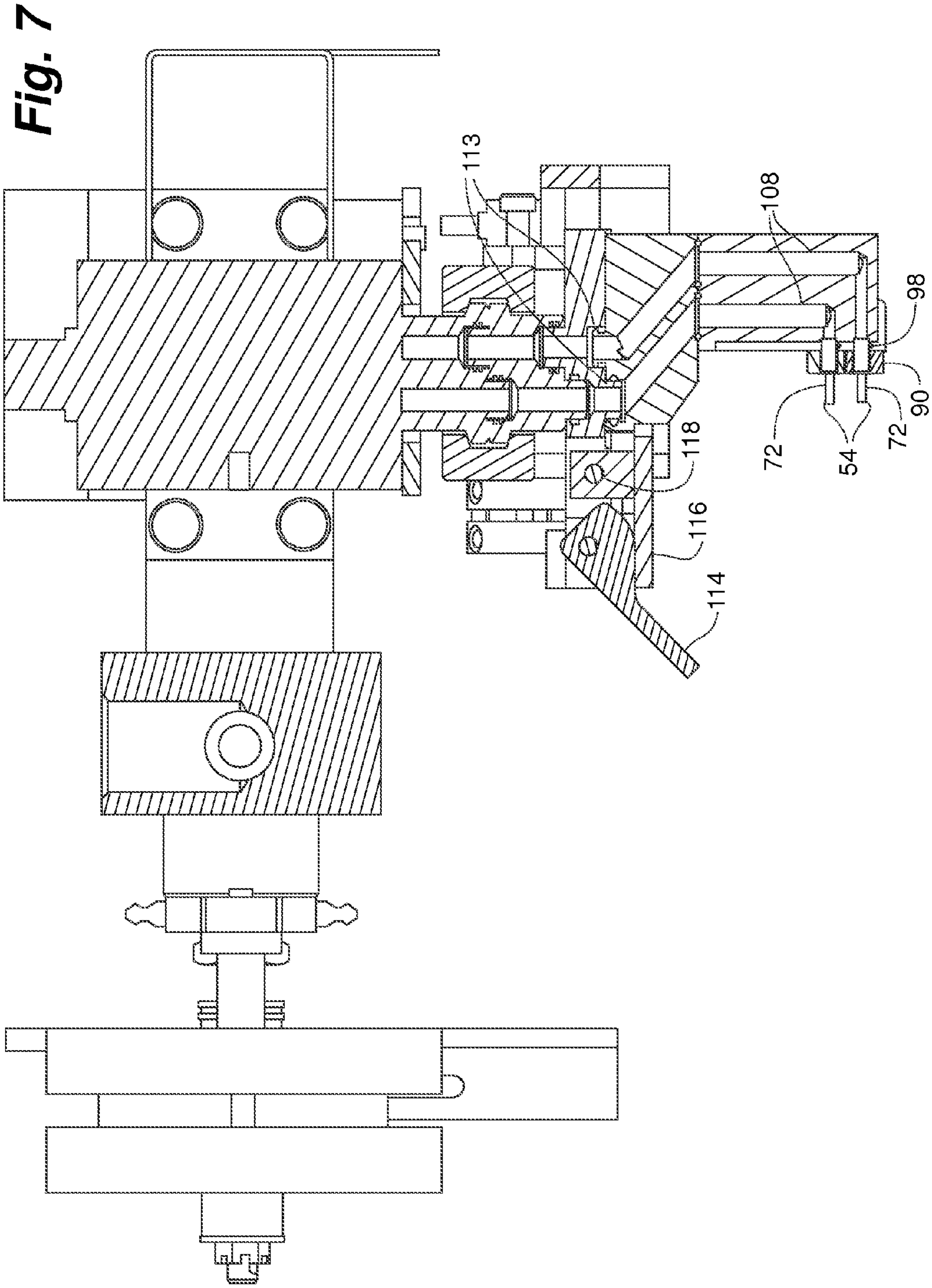
FIG. 7 is a sectional view of a fixed head edge sealant dispenser with dual dispensing nozzles taken along section line 7-7 of FIG. 5.

Referring to FIG. 7, dual dispensing nozzle 80 is depicted coupled to high volume metering pump 50. Also depicted is cam lock 114. Cam lock 114 when operated, applies force to lever 116 which pivots around fulcrum 118 to press dual dispensing nozzle 80 against complementary structures 113.

Referring to FIGS. 10-14, dual fixed head sealant dispenser 120 is depicted in several perspective views. Dual fixed head sealant dispenser 120 is generally similar to single nozzle sealant dispenser 62 but includes two high volume metering pumps 50, two depth sensors 54 and is adapted to utilize dual dispensing nozzle 80 as described above. Otherwise, similar structures of dual fixed head sealant dispenser 120 are labeled with similar reference numerals to those of single nozzle sealant dispenser 62.

Referring to FIGS. 10-13, heated nozzle garage 122 is also depicted. Heated nozzle garage 122 is positioned so that when single dispensing nozzle 78 or dual dispensing nozzle 80 is retracted, they come into contact with heated nozzle garage 122. Heated nozzle garage 122 may comprise an enclosure that encloses two or three sides of single dispensing nozzle 78 or dual dispensing nozzle 80. Heated nozzle garage 122 may also take the form of a block of metal which is heated and has significant thermal mass against which single dispensing nozzle 78 or dual dispensing nozzle 80 are brought into contact with. Heated nozzle garage 122 provides a source of heat to maintain the temperature of single dispensing nozzle 78 or dual dispensing nozzle 80 when sealant is not being dispensed. Heated nozzle garage 122 is utilized when hot melt sealants are utilized. The present invention may also be utilized with time setting sealants or two part sealants, in which case heated nozzle garage 122 may not be necessary.

A laser indicator aligned with nozzle orifice 124 may be utilized with the invention as well. Laser indicator (not shown) assists an operator with judging the location of nozzle orifice 124 relative to the insulated glass unit being edge sealed.

Fixed head sealant dispenser 26 may also include a mastic regulator (not shown) which controls sealant pressure and assists in lengthening pump life.

Controller 28 generally includes human machine interface (HMI) 126 and processor unit 128. Human machine interface 126 generally includes monitor 130 and foot pedal switch 132. Monitor 130 may be a touch screen monitor in order to actuate various controls. Processor unit 128 is operably coupled to and adapted to receive input from monitor 130 and foot pedal switch 132 as well as depth sensor 54, proximity sensors 58 and movement encoder 60. Processor unit 128 is also adapted to receive input from depth sensor 54 and to actuate the dispensing of sealant at a controlled volume depending upon the inputs from depth sensor 54, movement encoder 60 and human machine interface 126.

Sealant supply 30 is capable of supplying sealant under pressure and often includes a pump adapted to be coupled to a 55 gallon drum or other container of sealant. Sealant supply 30 is known in the art and will not be further described here.

In operation, an operator places an insulated glass unit that it is desired to edge seal on table 22. The IGU rests on IGU support structures 34, such as multi directional rollers 40. The operator moves the insulated glass unit until a first edge of the insulated glass unit makes contact with fence 24. The insulated glass unit is then slid along and in contact with fence 24 until it comes into the proximity of proximity sensors 58. Proximity sensors 58 sense the presence of the insulated glass unit and send a signal to controller 28 regarding the presence of insulated glass unit. Controller 28 then commands the extension of dam 56 and the positioning of fixed head sealant dispenser 26, proximate fence 24 and the insulated glass unit to be sealed. The operator then manually moves the insulated glass unit until it comes into contact with dam 56 and ski 68.

The operator then steps on foot pedal switch 132 which sends a signal to controller 28. In response to the signal, controller 28 actuates high volume metering pump 50 and depth sensor 54. Depth sensor 54 senses the depth at which the spacer of the insulated glass unit is recessed from the edge of the insulated glass unit and sends a signal to controller 28. Controller 28 then activates high volume metering pump 50 to make a prestart dispense of sealant. The prestart dispense of sealant fills the edge seal area of the insulated glass unit in the vicinity of the corner of the insulated glass unit where the insulated glass unit makes contact with dam 56 and IGU contact surface 82. Dam 56 and IGU contact surface 82 guide the sealant to fill the corner area of the insulated glass unit. Following this dispensing, controller 28 actuates retraction of dam 56.

The operator then manually moves the insulated glass unit, in this example embodiment, while maintaining contact with fence 24 and IGU support structures 34. Ski 68 remains in contact with the edge of the insulated glass unit. Because ski 68 is moveable and spring biased, it makes contact with the glass panes of the insulated glass unit and keeps sealant within the cavity to be filled. As the insulated glass unit moves along fence 24 and in contact with ski 68, as the insulated glass unit movement continues to move, depth sensor 54 continuously monitors the depth of the cavity being filled and provides information to controller 28 so that the quantity of sealant dispensed is appropriate to fill the cavity properly.

Prior to beginning the edge sealing process, the operator inputs data through human machine interface 126 to controller 28 as to the width of the insulated glass unit cavity between the panes of glass to be filled. The operator continues to move the insulated glass unit until the first edge of insulated glass unit approaches dispensing orifice 66. The operator may be assisted in judging this by the laser indicator device (not shown). The operator then can remove his foot from foot pedal switch 132 to deactivate pressure sensor 54 and high volume metering pump 50. At this point, controller 28 orders retraction of dispensing nozzle 52 and deactivation of depth sensor 54.

The operator can then move the insulated glass unit away from fence 24 on table 22 and rotate the insulated glass unit approximately ninety degrees or whatever rotation is appropriate to bring the next side of the IGU into contact with fence 24. The operator then returns the second edge of the insulated glass unit to contact with fence 24 and repeats the edge sealing procedure above for each side of the insulated glass unit.

The fixed head IGU edge sealer 20 of the present invention also is adapted to provide edge sealing of curved edges of IGU units which is accomplished in a similar fashion except that the operator keeps the curved edge of the IGU in contact with the dispensing nozzle 52 and depth sensor 54 while rotating the IGU about the center of the curvature of the curved side being sealed rather than moving the IGU parallel to fence 24.

Triple glazed IGU's can be edge sealed with single nozzle sealant dispenser 62 by edge sealing one of the two edge spaces first and then sealing the second of the edge spaces in a subsequent procedure.

Alternately, triple glazed insulated glass units can be edge sealed using dual fixed head sealant dispenser 120. The procedure to be followed is essentially identical to that above except for the fact that the two separate depth sensors independently sense the depth of the two separate edge seal cavities to be filled. Thus, the sealant dispensing is adjusted by controller 28 so that the proper volume of sealant is dispensed to edge seal each of the cavities simultaneously.

When edge sealing triple glazed IGU's, the upper edge of first ski 92 rides along the upper pane of glass, the lower edge of second ski 94 rides along the lower pane of glass, the central pane of glass abuts the juncture between first ski 92 and second ski 94. The interdigitated configuration of tab slots 102, downwardly extending tabs 100, upwardly extending tabs 104 and tab insets 106 permits dual ski assembly 90 to ride along the edges of all three insulated glass unit panes to properly confined the sealant to the appropriate cavities.

In an alternative embodiment of the invention, pinch rollers (not shown) may grip the insulated glass unit and also operate as movement encoder 60. Pinch rollers (not shown) may be motorized to provide a power assist to an operator moving an insulated glass unit for edge sealing. This arrangement may be helpful particularly in the use of two part sealants. Two part sealants include two components which are dispensed through a static mixing tube prior to being applied to the insulated glass unit. The static mixing tube provides considerable resistance to flow of the two part sealant and there is lag between the beginning of operation of the pump and the beginning of the flow of sealant at dispensing nozzle 52. Further, when high volume metering pump 50 is deactivated, there is continuing flow of sealant through the static mixing tube for a period of time thereafter. According to this embodiment of the invention, controller 28 is programmed to allow for this lag of dispensing and excess dispensing at the end.

Hot melt sealants are used more and more in modern manufacturing of insulated glass units. Heated nozzle garage 122 assist in the use of hot melt sealants by providing a source of additional heat to dispensing nozzle 52 when sealant is not flowing. When sealant is flowing, the heat of the already heated sealants keeps dispensing nozzle 52 at an appropriate temperature. In between insulated glass sealing procedures dispensing nozzle 52 tends to cool and become clogged with hot melt sealants. The use of heated nozzle garage 122 prevents this by providing an additional source of heat to dispensing nozzle 52. It is also possible to provide heating elements in contact with or inside of dispensing nozzle 52. This however increases the complexity of dispensing nozzle 52.

When an operator is edge sealing small insulated glass units, the operator may stand in operator space 38 and move movable IGU support 44 to position close to fixed head sealant dispenser 26. When larger insulated glass units are edge sealed, the operator may move movable IGU support 44 out farther away from fixed head sealant dispenser 26 to provide additional support for the insulated glass unit as it crosses operator space 38.

Overhead lights 36 provide additional illumination for insulated glass unit and its sealing operations.

Quick change coupling 70 facilitates the changing of dispensing nozzle 52. When it is desired to change dispensing nozzle 52, an operator may disengage cam lock 114, this releases force from lever 116 and allows lever 116 to pivot about fulcrum 118. Dispensing nozzle 52 may then be removed from its position. Boss 110 and bore 112 of dispensing nozzle 52 are coupled to complementary structures 113 in order to ascertain proper alignment of dispensing nozzle 52. Cam lock 114 then is actuated causing lever 116 to pivot about fulcrum 118 and to press dispensing nozzle 52 against complementary structures 113 to seal it in place.

Foot pedal switch 132 may be locate on foot pedal support 46, thus foot pedal support 46 and foot pedal switch 132 travel with movable IGU support 44 as it moves so that an operator may always reach foot pedal switch 132 regardless of the size of insulated glass unit being edge sealed.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

The invention claimed is:

1. An insulated glass secondary edge sealing device that dispenses sealant to insulated glass units including at least two panes of glass separated by a spacer, the spacer being located along a periphery of the insulated glass unit and inset from peripheral edges of the insulated glass unit, the insulated glass edge sealing device comprising:

a sealant dispensing head;

a table that supports the insulated glass units to be edge sealed, the table being structured such that the insulated glass units can be moved with minimal restriction in all horizontal directions while supported by the table, the sealant head being fixed in location relative to the table;

a fence extending adjacent the table, the fence being structured to abuttably limit movement of the insulated glass unit relative to the table and to permit linear movement of the insulated glass unit parallel to and in contact with the fence, the sealant dispensing head being located adjacent the fence and fixed relative the fence and the table;

the sealant dispensing head having a dispensing nozzle and a corner dam, the dispensing nozzle including a floating insulated glass unit contact surface sized to abut the peripheral edges of the at least two panes of glass of the insulated glass unit and the corner dam being adjacent to the floating insulated glass unit contact surface and being shiftable between a retracted position and an extended position and when in the extended position being oriented at substantially a right angle to the floating surface and extending generally perpendicular beyond the fence and toward the table;

a depth sensor that senses a depth of the inset of the spacer from the peripheral edges of the at least two glass panes when the insulated glass unit is abutted against the fence;

a linear motion encoder that monitors linear movement of the insulated glass unit in a direction parallel to the fence;

a metering device operably coupled in fluid communication to the dispensing nozzle to dispense the sealant; and a control unit that receives signals from the depth sensor and the linear motion encoder and controls the metering device to dispense a measured flow of sealant based on the depth of the inset of the spacer and the movement of the insulated glass unit parallel to the fence and relative to the encoder;

the dispensing nozzle being positionable so that the measured flow of sealant is discharged into a space bounded by the spacer and peripheral portions of the two panes of glass from the nozzle to accurately fill the space with sealant while the insulated glass unit is moved past the dispensing nozzle in contact with the fence.

2. The insulated glass secondary edge sealing device as claimed in claim 1, wherein the table further comprises a plurality of multi-directional rollers.

3. The insulated glass secondary edge sealing device as claimed in claim 1, wherein the table defines an operator space therein.

4. The insulated glass secondary edge sealing device as claimed in claim 3, wherein the table further includes a movable insulated glass unit support that is movable within the operator space.

5. The insulated glass secondary edge sealing device as claimed in claim 1, wherein the floating insulated glass unit contact surface further comprises a ski having an aperture therethrough and the nozzle further comprising a nozzle tube through which sealant is dispensed, the nozzle tube extending at least partially through aperture in the ski.

6. The insulated glass secondary edge sealing device as claimed in claim 1, wherein the floating insulated glass unit contact surface is generally cylindrical in shape and has a radius of curvature of between about two and four inches.

7. The insulated glass secondary edge sealing device as claimed in claim 1, wherein the dispensing nozzle is shiftable between a retracted position and an extended position, and further comprising a nozzle garage into which or against which the dispensing is located in the retracted position, the nozzle garage being heated whereby the nozzle is maintained at a temperature that keeps hot melt sealant fluid.

8. The insulated glass secondary edge sealing device as claimed in claim 1, further comprising a human machine interface and wherein the controller receives signals from the human machine interface and controls the extension and retraction of the corner dam based on the received signals and further controls the measured flow of sealant based on signals from the human machine interface.

9. The insulated glass secondary edge sealing device as claimed in claim 1, wherein he controller further controls the measured flow of sealant to make a prestart application of sealant and controls the corner dam to shift the corner dam from the extended position to the retracted position following the prestart application of sealant.

10. The insulated glass secondary edge sealing device as claimed in claim 1, further comprising a dual dispensing nozzle, the dual dispensing nozzle having a first ski and a second ski adjacent one another and the first ski having first adjacent edge and the second ski having a second adjacent edge, the first adjacent edge and the second adjacent edge having interdigitated structures.

11. The insulated glass secondary edge sealing device as claimed in claim 1, further comprising a first proximity sensor operably coupled to the control unit that senses a presence of the insulated glass unit and sends signals to the control unit when the insulated glass unit is sensed.

12. The insulated glass secondary edge sealing device as claimed in claim 11, further comprising a second proximity sensor operably coupled to the control unit that senses an end of a side of the insulated glass unit and sends signals to the control unit when the end of the side of the insulated glass unit is sensed.

13. A method of edge sealing insulated glass units including at least two panes of glass separated by a spacer, the spacer being located along a periphery of the insulated glass unit and inset from peripheral edges of the insulated glass unit, the method comprising:

sensing the presence of an insulated glass unit to be edge sealed that has been placed on a table when the insulated glass unit abuts a fence adjacent the table and adjacent a fixed sealant dispensing head;

activating a metering pump and a depth sensor in response to an input from a human machine interface receiving signals from a movement encoder that senses movement of the insulated glass unit parallel to the fence and relative to a fixed sealant dispensing head;

receiving signals from the depth sensor indicating the inset of the spacer from the peripheral edges of the at least two glass panes when the insulated glass unit is abutted against the fence;

receiving signals from the human machine interface indicating a distance between the two panes of glass; and controlling the metering pump to dispense a measured flow of sealant into a space that is bounded by the spacer and peripheral edges of the two panes of glass that extend beyond the spacer based on the depth of the inset of the spacer and the movement of the insulated glass unit parallel to the fence relative to the movement encoder.

14. The method as claimed in claim 13, further comprising extending a corner dam adjacent a dispensing nozzle including a floating insulated glass unit contact surface sized to abut the peripheral edges of the at least two panes of glass of the insulated glass unit and dispensing a prestart amount of sealant into the space bounded by the spacer, the peripheral edges of the two panes of glass that extend beyond the spacer, the corner dam and the insulated glass unit contact surface to seal a corner of the insulated glass unit.

15. The method as claimed in claim 14, further comprising retracting the corner dam after the dispensing of the prestart amount of sealant and prior to receiving signals from the movement encoder indicating movement of the insulated glass unit.

16. The method as claimed in claim 13, further comprising sensing an end of a side of the insulated glass unit and deactivating the metering pump to stop the flow of sealant when the end of the side is sensed.

17. The method as claimed in claim 13, further comprising receiving signals from a second depth sensor indicating the inset of a second spacer from the peripheral edges of the insulated glass unit when the insulated glass unit is abutted against the fence and controlling a second metering pump to dispense a measured flow of sealant into a second space that is bounded by the second spacer and peripheral edges of the two panes of glass that extend beyond the spacer based on the depth of the inset of the spacer and the movement of the insulated glass unit parallel to the fence relative to the movement encoder.

* * * * *

UNITED STATES PATENT AND TRADEMARK OFFICE

CERTIFICATE OF CORRECTION

PATENT NO. : 8,435,367 B2
APPLICATION NO. : 12/944262
DATED : May 7, 2013
INVENTOR(S) : Donohue It is certified that error appears in the above-identified patent and that said Letters Patent is hereby corrected as shown below:

The Title Page, showing the illustrative figure, should be deleted and substitute therefor the attached Title page.

Delete drawing sheets 1-13 and substitute therefor the drawing sheets, consisting of figs. 1-13 as shown on the attached page.

Signed and Sealed this
Seventh Day of October, 2014

Michelle K. Lee

Michelle K. Lee
*Deputy Director of the United States Patent and Trademark Office*

(12) United States Patent
Donohue

(10) Patent No.: US 8,435,367 B2
(45) Date of Patent: May 7, 2013

(54) FIXED HEAD INSULATED GLASS EDGE SEALING DEVICE

(75) Inventor: Morgan Donohue, North Oaks, MN (US)

(73) Assignee: Erdman Automation Corporation, Princeton, MN (US)

(*) Notice: Subject to any disclaimer, the term of this patent is extended or adjusted under 35 U.S.C. 154(b) by 351 days.

(21) Appl. No.: 12/944,262

(22) Filed: Nov. 11, 2010

(65) Prior Publication Data

US 2012/0118473 A1 May 17, 2012

(51) Int. Cl.
*B32B 41/00* (2006.01)

(52) U.S. Cl.
USPC ............ 156/64; 156/350; 156/351; 156/356; 156/367; 156/378; 156/379; 222/153.09; 222/166.5; 222/333; 222/367; 222/546.5; 418/178; 418/179; 418/196; 418/197; 29/888.023; 29/888.025

(58) Field of Classification Search .................... 156/64, 156/350, 351, 356, 367, 378, 379; 222/153.09, 222/166.5, 333, 367, 546.5, 566, 567, 573; 418/178, 179, 196, 197; 29/888.023, 888.025
See application file for complete search history.

(56) References Cited

U.S. PATENT DOCUMENTS

| | | | |
|---|---|---|---|
| 4,546,723 | A | 10/1985 | Leopold et al. |
| 4,634,024 | A | 1/1987 | Vollenweider |
| 4,714,425 | A | 12/1987 | Lenhardt |
| 4,826,547 | A | 5/1989 | Lenhardt |
| 5,136,974 | A | 8/1992 | Lisec |
| 5,290,600 | A | 3/1994 | Ord et al. |
| 5,319,186 | A | 6/1994 | Lenhardt |
| 5,462,199 | A | 10/1995 | Lenhardt |
| 5,902,652 | A | 5/1999 | Collins et al. |
| 6,017,578 | A | 1/2000 | Trautmann et al. |
| 6,030,475 | A | 2/2000 | Spotts, Jr. |
| 6,032,830 | A | 3/2000 | Brown |
| 6,197,231 | B1 | 3/2001 | Lisec |
| 6,234,355 | B1 | 5/2001 | Lenhardt |
| 6,257,444 | B1 | 7/2001 | Everett |
| 6,491,966 | B1 | 12/2002 | Lisec |
| 6,494,245 | B1 | 12/2002 | Simone |
| 6,554,043 | B2 | 4/2003 | Simone |
| 6,630,028 | B2 | 10/2003 | Briese et al. |
| 6,688,874 | B1 | 2/2004 | Simone |

(Continued)

OTHER PUBLICATIONS

Marketing Brochure, Glass Equipment Development, Inc., *Our Fully Integrated Line of IG Fabrication Machinery*, 2002, pp. 6.

(Continued)

*Primary Examiner* — Katarzyna Wyrozebski Lee
*Assistant Examiner* — Joshel Rivera
(74) *Attorney, Agent, or Firm* — Patterson Thuente Pedersen, P.A.

(57) ABSTRACT

An insulated glass secondary edge sealing device that dispenses sealant to insulated glass units including at least two panes of glass separated by a spacer, including a fixed sealant dispensing head, a table that supports the insulated glass units, a fence, a depth sensor, a linear motion encoder, a metering device. The sealant dispensing head has a dispensing nozzle and a corner dam. The dispensing nozzle includes a floating insulated glass unit contact surface and the corner dam is shiftable between a retracted position and an extended position. A control unit receives signals from the depth sensor and the linear motion encoder and controls the metering device to dispense a measured flow of sealant based on the depth of the inset of the spacer and the movement of the insulated glass unit parallel to the fence and relative to the encoder.

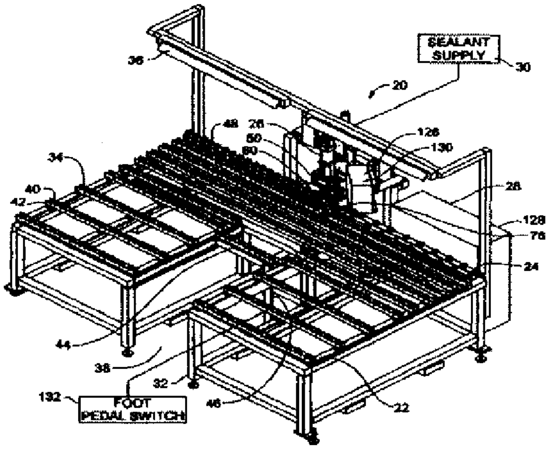

17 Claims, 13 Drawing Sheets